US009644982B2

(12) United States Patent
Kantarjiev et al.

(10) Patent No.: US 9,644,982 B2
(45) Date of Patent: May 9, 2017

(54) SYSTEM AND METHOD FOR DELIVERING DEPARTURE NOTIFICATIONS

(71) Applicant: Pelmorex Canada Inc., Oakville, Ontario (CA)

(72) Inventors: Christopher Kantarjiev, Palo Alto, CA (US); Jonathan Hubbard, San Francisco, CA (US); Jonathan Tash, Tucson, AZ (US)

(73) Assignee: PELMOREX CANADA INC., Oakville, Ontario (CA)

( * ) Notice: Subject to any disclaimer, the term of this patent is extended or adjusted under 35 U.S.C. 154(b) by 0 days.

(21) Appl. No.: 14/846,576

(22) Filed: Sep. 4, 2015

(65) Prior Publication Data
US 2016/0047667 A1    Feb. 18, 2016

Related U.S. Application Data

(63) Continuation of application No. 14/155,174, filed on Jan. 14, 2014, now Pat. No. 9,127,959, which is a continuation of application No. 13/316,250, filed on Dec. 9, 2011, now Pat. No. 8,660,780, which is a continuation of application No. 12/763,199, filed on Apr. 19, 2010, now Pat. No. 8,103,443, which is a continuation of application No. 12/283,748, filed on Sep. 12, 2008, now Pat. No. 7,702,452, which is a
(Continued)

(51) Int. Cl.
*G01C 21/26* (2006.01)
*G01C 21/34* (2006.01)
*G08G 1/01* (2006.01)
*G01C 21/36* (2006.01)

(52) U.S. Cl.
CPC ..... *G01C 21/3492* (2013.01); *G01C 21/3415* (2013.01); *G01C 21/3453* (2013.01); *G01C 21/3667* (2013.01); *G01C 21/3679* (2013.01); *G01C 21/3691* (2013.01); *G08G 1/0112* (2013.01); *G08G 1/0116* (2013.01); *G08G 1/0129* (2013.01); *G08G 1/0145* (2013.01)

(58) Field of Classification Search
CPC combination set(s) only.
See application file for complete search history.

(56) References Cited

U.S. PATENT DOCUMENTS

| 4,734,863 A | 3/1988 | Honey et al. |
| 4,788,645 A | 11/1988 | Zavoli et al. |

(Continued)

FOREIGN PATENT DOCUMENTS

| CO | 6710924 | 7/2013 |
| DE | 19856704 | 6/2001 |

(Continued)

OTHER PUBLICATIONS

U.S. Appl. No. 14/275,702, Office Action mailed Nov. 30, 2015.
(Continued)

*Primary Examiner* — Yonel Beaulieu
(74) *Attorney, Agent, or Firm* — Polsinelli LLP

(57) ABSTRACT

The present invention provides a system and method for determining the necessary departure time to allow for an on-time or desired arrival time at a particular location over a particular route based on the evaluation of historic, present, and predicted road conditions.

13 Claims, 8 Drawing Sheets

Related U.S. Application Data continuation of application No. 10/897,550, filed on Jul. 23, 2004, now Pat. No. 7,610,145.

(60) Provisional application No. 60/490,199, filed on Jul. 25, 2003.

(56) References Cited

U.S. PATENT DOCUMENTS

| | | |
|---|---|---|
| 4,792,803 A | 12/1988 | Madnick et al. |
| 4,796,191 A | 1/1989 | Honey et al. |
| 4,878,170 A | 10/1989 | Zeevi |
| 4,914,605 A | 4/1990 | Loughmiller, Jr. et al. |
| 4,926,343 A | 5/1990 | Tsuruta et al. |
| 5,068,656 A | 11/1991 | Sutherland |
| 5,086,510 A | 2/1992 | Guenther et al. |
| 5,095,532 A | 3/1992 | Mardus |
| 5,126,941 A | 6/1992 | Gurmu et al. |
| 5,164,904 A | 11/1992 | Sumner |
| 5,173,691 A | 12/1992 | Sumner |
| 5,182,555 A | 1/1993 | Sumner |
| 5,220,507 A | 6/1993 | Kirson |
| 5,247,439 A | 9/1993 | Gurmu et al. |
| 5,262,775 A | 11/1993 | Tamai et al. |
| 5,276,785 A | 1/1994 | Mackinlay et al. |
| 5,283,575 A | 2/1994 | Kao et al. |
| 5,291,412 A | 3/1994 | Tamai et al. |
| 5,291,413 A | 3/1994 | Tamai et al. |
| 5,291,414 A | 3/1994 | Tamai et al. |
| 5,297,028 A | 3/1994 | Ishikawa |
| 5,297,049 A | 3/1994 | Gurmu et al. |
| 5,303,159 A | 4/1994 | Tamai et al. |
| 5,311,195 A | 5/1994 | Mathis et al. |
| 5,311,434 A | 5/1994 | Tamai |
| 5,339,246 A | 8/1994 | Kao |
| 5,343,400 A | 8/1994 | Ishikawa |
| 5,345,382 A | 9/1994 | Kao |
| 5,359,529 A | 10/1994 | Snider |
| 5,374,933 A | 12/1994 | Kao |
| 5,377,113 A | 12/1994 | Shibazaki et al. |
| 5,390,123 A | 2/1995 | Ishikawa |
| 5,394,333 A | 2/1995 | Kao |
| 5,402,120 A | 3/1995 | Fujii et al. |
| 5,414,630 A | 5/1995 | Oshizawa et al. |
| 5,428,545 A | 6/1995 | Maegawa et al. |
| 5,430,655 A | 7/1995 | Adachi |
| 5,440,484 A | 8/1995 | Kao |
| 5,465,079 A | 11/1995 | Bouchard et al. |
| 5,477,220 A | 12/1995 | Ishikawa |
| 5,485,161 A | 1/1996 | Vaughn |
| 5,488,559 A | 1/1996 | Seymour |
| 5,499,182 A | 3/1996 | Ousborne |
| 5,504,482 A | 4/1996 | Schreder |
| 5,508,931 A | 4/1996 | Snider |
| 5,515,283 A | 5/1996 | Desai |
| 5,515,284 A | 5/1996 | Abe |
| 5,539,645 A | 7/1996 | Mandhyan et al. |
| 5,546,107 A | 8/1996 | Deretsky et al. |
| 5,548,822 A | 8/1996 | Yogo |
| 5,550,538 A | 8/1996 | Fujii et al. |
| 5,554,845 A | 9/1996 | Russell |
| 5,583,972 A | 12/1996 | Miller |
| 5,608,635 A | 3/1997 | Tamai |
| 5,610,821 A | 3/1997 | Gazis et al. |
| 5,689,252 A | 11/1997 | Ayanoglu et al. |
| 5,694,534 A | 12/1997 | White, Jr. et al. |
| 5,699,056 A | 12/1997 | Yoshida |
| 5,706,503 A | 1/1998 | Poppen et al. |
| 5,712,788 A | 1/1998 | Liaw et al. |
| 5,729,458 A | 3/1998 | Poppen |
| 5,731,978 A | 3/1998 | Tamai et al. |
| 5,742,922 A | 4/1998 | Kim |
| 5,751,245 A | 5/1998 | Janky et al. |
| 5,751,246 A | 5/1998 | Hertel |
| 5,757,359 A | 5/1998 | Morimoto et al. |
| 5,774,827 A | 6/1998 | Smith et al. |
| 5,818,356 A | 10/1998 | Schuessler |
| 5,822,712 A | 10/1998 | Olsson |
| 5,842,142 A | 11/1998 | Murray et al. |
| 5,845,227 A | 12/1998 | Peterson |
| 5,850,190 A | 12/1998 | Wicks et al. |
| 5,862,244 A | 1/1999 | Kleiner et al. |
| 5,862,509 A | 1/1999 | Desai et al. |
| 5,864,305 A | 1/1999 | Rosenquist |
| 5,867,110 A | 2/1999 | Naito et al. |
| 5,893,081 A | 4/1999 | Poppen |
| 5,893,898 A | 4/1999 | Tanimoto |
| 5,898,390 A | 4/1999 | Oshizawa et al. |
| 5,902,350 A | 5/1999 | Tamai et al. |
| 5,904,728 A | 5/1999 | Tamai et al. |
| 5,908,464 A | 6/1999 | Kishigami et al. |
| 5,910,177 A | 6/1999 | Zuber |
| 5,911,773 A | 6/1999 | Mutsuga et al. |
| 5,912,635 A | 6/1999 | Oshizawa et al. |
| 5,916,299 A | 6/1999 | Poppen |
| 5,922,042 A | 7/1999 | Sekine et al. |
| 5,928,307 A | 7/1999 | Oshizawa et al. |
| 5,931,888 A | 8/1999 | Hiyokawa |
| 5,933,100 A | 8/1999 | Golding |
| 5,938,720 A | 8/1999 | Tamai |
| 5,948,043 A | 9/1999 | Mathis et al. |
| 5,978,730 A | 11/1999 | Poppen et al. |
| 5,982,298 A | 11/1999 | Lappenbusch et al. |
| 5,987,381 A | 11/1999 | Oshizawa et al. |
| 5,991,687 A | 11/1999 | Hale et al. |
| 5,999,882 A | 12/1999 | Simpson et al. |
| 6,009,374 A | 12/1999 | Urahashi |
| 6,011,494 A | 1/2000 | Watanabe et al. |
| 6,016,485 A | 1/2000 | Amakawa et al. |
| 6,021,406 A | 2/2000 | Kuznetsov |
| 6,038,509 A | 3/2000 | Poppen et al. |
| 6,058,390 A | 5/2000 | Liaw et al. |
| 6,064,970 A | 5/2000 | McMillan et al. |
| 6,091,359 A | 7/2000 | Geier |
| 6,091,956 A | 7/2000 | Hollenberg |
| 6,097,399 A | 8/2000 | Bhatt et al. |
| 6,111,521 A | 8/2000 | Mulder et al. |
| 6,144,919 A | 11/2000 | Ceylan et al. |
| 6,147,626 A | 11/2000 | Sakakibara |
| 6,150,961 A | 11/2000 | Alewine et al. |
| 6,161,092 A | 12/2000 | Latshaw et al. |
| 6,169,552 B1 | 1/2001 | Endo et al. |
| 6,188,956 B1 | 2/2001 | Walters |
| 6,209,026 B1 | 3/2001 | Ran et al. |
| 6,222,485 B1 | 4/2001 | Walters et al. |
| 6,226,591 B1 | 5/2001 | Okumura et al. |
| 6,236,933 B1 | 5/2001 | Lang |
| 6,253,146 B1 | 6/2001 | Hanson et al. |
| 6,253,154 B1 | 6/2001 | Oshizawa et al. |
| 6,256,577 B1 | 7/2001 | Graunke |
| 6,259,987 B1 | 7/2001 | Ceylan et al. |
| 6,282,486 B1 | 8/2001 | Bates et al. |
| 6,282,496 B1 | 8/2001 | Chowdhary |
| 6,292,745 B1 | 9/2001 | Robare et al. |
| 6,295,492 B1 | 9/2001 | Lang et al. |
| 6,297,748 B1 | 10/2001 | Lappenbusch et al. |
| 6,298,305 B1 | 10/2001 | Kadaba et al. |
| 6,317,685 B1 | 11/2001 | Kozak et al. |
| 6,317,686 B1 | 11/2001 | Ran |
| 6,335,765 B1 | 1/2002 | Daly et al. |
| 6,353,795 B1 | 3/2002 | Ranjan |
| 6,356,836 B1 | 3/2002 | Adolph |
| 6,360,165 B1 | 3/2002 | Chowdhary |
| 6,360,168 B1 | 3/2002 | Shimabara |
| 6,362,778 B2 | 3/2002 | Neher |
| 6,415,291 B2 | 7/2002 | Bouve et al. |
| 6,424,910 B1 | 7/2002 | Ohler et al. |
| 6,442,615 B1 | 8/2002 | Nordenstam et al. |
| 6,456,931 B1 | 9/2002 | Polidi et al. |
| 6,456,935 B1 | 9/2002 | Ng |
| 6,463,400 B1 | 10/2002 | Barkley-Yeung |
| 6,466,862 B1 | 10/2002 | DeKock et al. |
| 6,470,268 B1 | 10/2002 | Ashcraft et al. |
| 6,473,000 B1 | 10/2002 | Secreet et al. |
| 6,480,783 B1 | 11/2002 | Myr |

(56) References Cited

U.S. PATENT DOCUMENTS

| | | |
|---|---|---|
| 6,504,541 B1 | 1/2003 | Liu et al. |
| 6,526,335 B1 | 2/2003 | Treyz et al. |
| 6,529,143 B2 | 3/2003 | Mikkola et al. |
| 6,532,304 B1 | 3/2003 | Liu et al. |
| 6,539,302 B1 | 3/2003 | Bender et al. |
| 6,542,814 B2 | 4/2003 | Polidi et al. |
| 6,552,656 B2 | 4/2003 | Polidi et al. |
| 6,556,905 B1 | 4/2003 | Mittelsteadt et al. |
| 6,559,865 B1 | 5/2003 | Angwin |
| 6,574,548 B2 | 6/2003 | DeKock et al. |
| 6,584,400 B2 | 6/2003 | Beardsworth |
| 6,594,576 B2 | 7/2003 | Fan et al. |
| 6,598,016 B1 | 7/2003 | Zavoli et al. |
| 6,600,994 B1 | 7/2003 | Polidi |
| 6,603,405 B2 | 8/2003 | Smith |
| 6,622,086 B2 | 9/2003 | Polidi |
| 6,639,550 B2 | 10/2003 | Knockeart et al. |
| 6,643,581 B2 | 11/2003 | Ooishi |
| 6,650,948 B1 | 11/2003 | Atkinson et al. |
| 6,650,997 B2 | 11/2003 | Funk |
| 6,654,681 B1 | 11/2003 | Kiendl et al. |
| 6,675,085 B2 | 1/2004 | Straub |
| 6,681,176 B2 | 1/2004 | Funk et al. |
| 6,687,615 B1 | 2/2004 | Krull et al. |
| 6,700,503 B2 | 3/2004 | Masar et al. |
| 6,710,774 B1 | 3/2004 | Kawasaki et al. |
| 6,720,889 B2 | 4/2004 | Yamaki et al. |
| 6,728,605 B2 | 4/2004 | Lash et al. |
| 6,728,628 B2 | 4/2004 | Peterson |
| 6,731,940 B1 | 5/2004 | Nagendran |
| 6,735,516 B1 | 5/2004 | Manson |
| 6,754,833 B1 | 6/2004 | Black et al. |
| 6,785,606 B2 | 8/2004 | DeKock et al. |
| 6,791,472 B1 | 9/2004 | Hoffberg |
| 6,807,483 B1 | 10/2004 | Chao et al. |
| 6,845,316 B2 | 1/2005 | Yates |
| 6,859,728 B2 | 2/2005 | Sakamoto et al. |
| 6,862,524 B1 | 3/2005 | Nagda et al. |
| RE38,724 E | 4/2005 | Peterson |
| 6,885,937 B1 | 4/2005 | Suranyi |
| 6,901,330 B1 | 5/2005 | Krull et al. |
| 6,914,541 B1 | 7/2005 | Zierden |
| 6,922,629 B2 | 7/2005 | Yoshikawa et al. |
| 6,931,309 B2 | 8/2005 | Phelan et al. |
| 6,952,643 B2 | 10/2005 | Matsuoka et al. |
| 6,965,665 B2 | 11/2005 | Fan et al. |
| 6,983,204 B2 | 1/2006 | Knutson |
| 6,987,964 B2 | 1/2006 | Obradovich et al. |
| 6,989,765 B2 | 1/2006 | Gueziec |
| 6,999,873 B1 | 2/2006 | Krull et al. |
| 7,010,583 B1 | 3/2006 | Aizono et al. |
| 7,062,378 B2 | 6/2006 | Krull et al. |
| 7,069,143 B2 | 6/2006 | Peterson |
| 7,103,854 B2 | 9/2006 | Fuchs et al. |
| 7,161,497 B2 | 1/2007 | Gueziec |
| 7,209,828 B2 | 4/2007 | Katou |
| 7,221,287 B2 | 5/2007 | Gueziec et al. |
| 7,243,134 B2 | 7/2007 | Bruner et al. |
| 7,343,242 B2 | 3/2008 | Breitenberger et al. |
| 7,356,392 B2 | 4/2008 | Hubbard et al. |
| 7,375,649 B2 | 5/2008 | Gueziec |
| 7,424,388 B2 | 9/2008 | Sato |
| 7,433,676 B2 | 10/2008 | Kobayashi et al. |
| 7,440,842 B1 | 10/2008 | Vorona |
| 7,486,201 B2 | 2/2009 | Kelly et al. |
| 7,508,321 B2 | 3/2009 | Gueziec |
| 7,557,730 B2 | 7/2009 | Gueziec |
| 7,558,674 B1 | 7/2009 | Neilley et al. |
| 7,603,138 B2 | 10/2009 | Zhang et al. |
| 7,610,145 B2 | 10/2009 | Kantarjiev et al. |
| 7,613,564 B2 | 11/2009 | Vorona |
| 7,634,352 B2 | 12/2009 | Soulchin et al. |
| 7,702,452 B2 | 4/2010 | Kantarjiev et al. |
| 7,792,642 B1 | 9/2010 | Neilley et al. |
| 7,835,858 B2 | 11/2010 | Smyth et al. |
| 7,847,708 B1 | 12/2010 | Jones et al. |
| 7,880,642 B2 | 2/2011 | Gueziec |
| 7,908,076 B2 | 3/2011 | Downs et al. |
| 7,912,627 B2 | 3/2011 | Downs et al. |
| 8,024,111 B1 | 9/2011 | Meadows et al. |
| 8,103,443 B2 | 1/2012 | Kantarjiev et al. |
| 8,229,658 B2 | 7/2012 | Dabell |
| 8,358,222 B2 | 1/2013 | Gueziec |
| 8,428,856 B2 | 4/2013 | Tischer |
| 8,531,312 B2 | 9/2013 | Gueziec |
| 8,537,033 B2 | 9/2013 | Gueziec |
| 8,564,455 B2 | 10/2013 | Gueziec |
| 8,618,954 B2 | 12/2013 | Free |
| 8,619,072 B2 | 12/2013 | Gueziec et al. |
| 8,660,780 B2 | 2/2014 | Kantarjiev |
| 8,718,910 B2 | 5/2014 | Gueziec |
| 8,725,396 B2 | 5/2014 | Gueziec |
| 8,781,718 B2 | 7/2014 | Margulici |
| 8,786,464 B2 | 7/2014 | Gueziec |
| 8,825,356 B2 | 9/2014 | Vorona |
| 8,958,988 B2 | 2/2015 | Gueziec |
| 8,965,695 B2 | 2/2015 | Tzamaloukas |
| 8,972,171 B1 | 3/2015 | Barth |
| 8,982,116 B2 | 3/2015 | Gueziec |
| 9,002,636 B2 | 4/2015 | Udeshi et al. |
| 9,046,924 B2 | 6/2015 | Gueziec |
| 9,070,291 B2 | 6/2015 | Gueziec |
| 9,082,303 B2 | 7/2015 | Gueziec |
| 9,127,959 B2 * | 9/2015 | Kantarjiev ............ G08G 1/0112 |
| 9,158,980 B1 | 10/2015 | Ferguson et al. |
| 9,293,039 B2 | 3/2016 | Margulici |
| 9,368,029 B2 | 6/2016 | Gueziec |
| 9,390,620 B2 | 7/2016 | Gueziec |
| 9,401,088 B2 | 7/2016 | Gueziec |
| 9,448,690 B2 | 9/2016 | Gueziec et al. |
| 9,489,842 B2 | 11/2016 | Gueziec |
| 2001/0005809 A1 | 6/2001 | Ito |
| 2001/0014848 A1 | 8/2001 | Walgers et al. |
| 2001/0018628 A1 | 8/2001 | Jenkins et al. |
| 2001/0026276 A1 | 10/2001 | Sakamoto et al. |
| 2001/0033225 A1 | 10/2001 | Razavi et al. |
| 2001/0047242 A1 | 11/2001 | Ohta |
| 2001/0049424 A1 * | 12/2001 | Petiniot .................. C08J 3/226 526/89 |
| 2002/0022923 A1 | 2/2002 | Hirabayashi et al. |
| 2002/0042819 A1 | 4/2002 | Reichert et al. |
| 2002/0077748 A1 | 6/2002 | Nakano |
| 2002/0152020 A1 | 10/2002 | Seibel |
| 2002/0177947 A1 | 11/2002 | Cayford |
| 2003/0009277 A1 | 1/2003 | Fan et al. |
| 2003/0046158 A1 | 3/2003 | Kratky |
| 2003/0055558 A1 | 3/2003 | Watanabe et al. |
| 2003/0109985 A1 | 6/2003 | Kotzin |
| 2003/0135304 A1 | 7/2003 | Sroub et al. |
| 2003/0151592 A1 | 8/2003 | Ritter |
| 2003/0182052 A1 | 9/2003 | DeLorme et al. |
| 2004/0034464 A1 | 2/2004 | Yoshikawa et al. |
| 2004/0046759 A1 | 3/2004 | Soulchin et al. |
| 2004/0049424 A1 | 3/2004 | Murray et al. |
| 2004/0080624 A1 | 4/2004 | Yuen |
| 2004/0107288 A1 | 6/2004 | Menninger et al. |
| 2004/0143385 A1 | 7/2004 | Smyth et al. |
| 2004/0166939 A1 | 8/2004 | Leifer et al. |
| 2004/0225437 A1 | 11/2004 | Endo et al. |
| 2004/0249568 A1 | 12/2004 | Endo et al. |
| 2005/0021225 A1 | 1/2005 | Kantarjiev et al. |
| 2005/0027436 A1 | 2/2005 | Yoshikawa et al. |
| 2005/0083325 A1 | 4/2005 | Cho |
| 2005/0099321 A1 | 5/2005 | Pearce |
| 2005/0143902 A1 | 6/2005 | Soulchin et al. |
| 2005/0154505 A1 | 7/2005 | Nakamura et al. |
| 2005/0212756 A1 | 9/2005 | Marvit et al. |
| 2005/0240340 A1 | 10/2005 | Ishikawa et al. |
| 2006/0074546 A1 | 4/2006 | DeKock et al. |
| 2006/0122846 A1 | 6/2006 | Burr et al. |
| 2006/0136846 A1 | 6/2006 | Im et al. |
| 2006/0143959 A1 | 7/2006 | Stehle et al. |
| 2006/0145892 A1 | 7/2006 | Gueziec |
| 2006/0158330 A1 | 7/2006 | Gueziec |

(56) References Cited

U.S. PATENT DOCUMENTS

| | | |
|---|---|---|
| 2006/0238521 A1 | 10/2006 | Westerman et al. |
| 2006/0238617 A1 | 10/2006 | Tamir |
| 2006/0284766 A1 | 12/2006 | Gruchala et al. |
| 2007/0009156 A1 | 1/2007 | O'Hara |
| 2007/0013551 A1 | 1/2007 | Gueziec |
| 2007/0038362 A1 | 2/2007 | Gueziec |
| 2007/0060384 A1 | 3/2007 | Dohta |
| 2007/0066394 A1 | 3/2007 | Ikeda et al. |
| 2007/0115252 A1 | 5/2007 | Burgmans |
| 2007/0142995 A1 | 6/2007 | Wottlermann |
| 2007/0197217 A1 | 8/2007 | Sutardja |
| 2007/0208494 A1 | 9/2007 | Chapman et al. |
| 2007/0208495 A1 | 9/2007 | Chapman et al. |
| 2007/0208496 A1 | 9/2007 | Downs et al. |
| 2007/0211026 A1 | 9/2007 | Ohta |
| 2007/0211027 A1 | 9/2007 | Ohta |
| 2007/0222750 A1 | 9/2007 | Ohta |
| 2007/0247291 A1 | 10/2007 | Masuda et al. |
| 2007/0265766 A1 | 11/2007 | Jung et al. |
| 2008/0014908 A1 | 1/2008 | Vasant |
| 2008/0021632 A1 | 1/2008 | Amano |
| 2008/0071465 A1 | 3/2008 | Chapman et al. |
| 2008/0084385 A1 | 4/2008 | Ranta et al. |
| 2008/0096654 A1 | 4/2008 | Mondesir et al. |
| 2008/0133120 A1 | 6/2008 | Romanick |
| 2008/0248848 A1 | 10/2008 | Rippy et al. |
| 2008/0255754 A1 | 10/2008 | Pinto |
| 2008/0287189 A1 | 11/2008 | Rabin |
| 2008/0297488 A1 | 12/2008 | Operowsky et al. |
| 2009/0005965 A1 | 1/2009 | Forstall et al. |
| 2009/0061971 A1 | 3/2009 | Weitzner et al. |
| 2009/0066495 A1 | 3/2009 | Newhouse et al. |
| 2009/0082950 A1 | 3/2009 | Vorona |
| 2009/0096753 A1 | 4/2009 | Lim |
| 2009/0112465 A1 | 4/2009 | Weiss et al. |
| 2009/0118017 A1 | 5/2009 | Perlman et al. |
| 2009/0118996 A1 | 5/2009 | Kantarjiev et al. |
| 2009/0189979 A1 | 7/2009 | Smyth |
| 2009/0192702 A1 | 7/2009 | Bourne |
| 2009/0254272 A1 | 10/2009 | Hendrey |
| 2010/0036594 A1 | 2/2010 | Yamane |
| 2010/0045517 A1 | 2/2010 | Tucker |
| 2010/0079306 A1 | 4/2010 | Liu et al. |
| 2010/0094531 A1 | 4/2010 | MacLeod |
| 2010/0100307 A1 | 4/2010 | Kim |
| 2010/0145569 A1 | 6/2010 | Bourque et al. |
| 2010/0145608 A1 | 6/2010 | Kurtti et al. |
| 2010/0164753 A1 | 7/2010 | Free |
| 2010/0175006 A1 | 7/2010 | Li |
| 2010/0194632 A1 | 8/2010 | Raento et al. |
| 2010/0198453 A1 | 8/2010 | Dorogusker et al. |
| 2010/0225643 A1 | 9/2010 | Gueziec |
| 2010/0305839 A1 | 12/2010 | Wenzel |
| 2010/0312462 A1 | 12/2010 | Gueziec |
| 2010/0333045 A1 | 12/2010 | Gueziec |
| 2011/0029189 A1 | 2/2011 | Hyde et al. |
| 2011/0037619 A1 | 2/2011 | Ginsberg et al. |
| 2011/0106427 A1 | 5/2011 | Kim et al. |
| 2011/0161261 A1 | 6/2011 | Wu et al. |
| 2011/0304447 A1 | 12/2011 | Marumoto |
| 2012/0044066 A1 | 2/2012 | Mauderer et al. |
| 2012/0065871 A1 | 3/2012 | Deshpande et al. |
| 2012/0072096 A1 | 3/2012 | Chapman et al. |
| 2012/0123667 A1 | 5/2012 | Gueziec |
| 2012/0150422 A1 | 6/2012 | Kantarjiev et al. |
| 2012/0150425 A1 | 6/2012 | Chapman et al. |
| 2012/0158275 A1 | 6/2012 | Huang et al. |
| 2012/0226434 A1 | 9/2012 | Chiu |
| 2012/0290202 A1 | 11/2012 | Gueziec |
| 2012/0290204 A1 | 11/2012 | Gueziec |
| 2012/0296559 A1 | 11/2012 | Gueziec |
| 2013/0033385 A1 | 2/2013 | Gueziec |
| 2013/0204514 A1 | 8/2013 | Margulici |
| 2013/0207817 A1 | 8/2013 | Gueziec |
| 2013/0211701 A1 | 8/2013 | Baker et al. |
| 2013/0297175 A1 | 11/2013 | Davidson |
| 2013/0304347 A1 | 11/2013 | Davidson |
| 2013/0304349 A1 | 11/2013 | Davidson |
| 2014/0088871 A1 | 3/2014 | Gueziec |
| 2014/0091950 A1 | 4/2014 | Gueziec |
| 2014/0107923 A1 | 4/2014 | Gueziec |
| 2014/0129124 A1 | 5/2014 | Margulici |
| 2014/0129142 A1 | 5/2014 | Kantarjiev |
| 2014/0139520 A1 | 5/2014 | Gueziec |
| 2014/0200807 A1 | 7/2014 | Geisberger |
| 2014/0236464 A1 | 8/2014 | Gueziec |
| 2014/0249734 A1 | 9/2014 | Gueziec |
| 2014/0316688 A1 | 10/2014 | Margulici |
| 2014/0320315 A1 | 10/2014 | Gueziec |
| 2015/0081196 A1 | 3/2015 | Petty et al. |
| 2015/0141043 A1 | 5/2015 | Abramson et al. |
| 2015/0168174 A1 | 6/2015 | Abramson et al. |
| 2015/0168175 A1 | 6/2015 | Abramson et al. |
| 2015/0177018 A1 | 6/2015 | Gueziec |
| 2015/0248795 A1 | 9/2015 | Davidson |
| 2015/0261308 A1 | 9/2015 | Gueziec |
| 2015/0268055 A1 | 9/2015 | Gueziec |
| 2015/0268056 A1 | 9/2015 | Gueziec |
| 2015/0325123 A1 | 11/2015 | Gueziec |
| 2016/0627788 | 9/2016 | Margulici |
| 2016/0302047 A1 | 10/2016 | Gueziec |
| 2016/0321918 A1 | 11/2016 | Gu ziec |
| 2016/0335893 A1 | 11/2016 | Gueziec |

FOREIGN PATENT DOCUMENTS

| | | |
|---|---|---|
| EP | 0 680 648 | 11/1995 |
| EP | 0 749 103 | 12/1996 |
| EP | 0 987 665 | 3/2000 |
| EP | 1 006 367 | 6/2000 |
| EP | 1 235 195 | 8/2002 |
| EP | 2 178 061 | 4/2010 |
| EP | 2 635 989 | 9/2011 |
| EP | 2 616 910 | 7/2013 |
| EP | 2 638 493 | 9/2013 |
| EP | 2 710 571 | 3/2014 |
| EP | 2 820 631 | 1/2015 |
| GB | 2 400 293 | 10/2004 |
| JP | 05-313578 | 11/1993 |
| JP | 08-77485 | 3/1996 |
| JP | 10-261188 | 9/1998 |
| JP | 10-281782 | 10/1998 |
| JP | 10-293533 | 11/1998 |
| JP | 2000-055675 | 2/2000 |
| JP | 2000-113387 | 4/2000 |
| JP | 2001-330451 | 11/2001 |
| WO | WO 96/36929 | 11/1996 |
| WO | WO 98/23018 | 5/1998 |
| WO | WO 00/50917 | 8/2000 |
| WO | WO 01/88480 | 11/2001 |
| WO | WO 02/077921 | 10/2002 |
| WO | WO 03/014671 | 2/2003 |
| WO | WO 2005/013063 | 2/2005 |
| WO | WO 2005/076031 | 8/2005 |
| WO | WO 2010/073053 | 7/2010 |
| WO | WO 2012/024694 | 2/2012 |
| WO | WO 2012/037287 | 3/2012 |
| WO | WO 2012/065188 | 5/2012 |
| WO | WO 2012/159083 | 11/2012 |
| WO | WO 2013/113029 | 8/2013 |

OTHER PUBLICATIONS

U.S. Appl. No. 14/265,290, Office Action mailed May 31, 2016.

Acura Debuts AcuraLink™ Satellite-Linked Communication System with Industry's First Standard Real Time Traffic Feature at New York International Auto Show, 2004, 4 pages.

Adib Kanafani, "Towards a Technology Assessment of Highway Navigation and Route Guidance," Program on Advanced Technology for the Highway, Institute of Transportation Studies, University of California, Berkeley, Dec. 1987, PATH Working Paper UCB-ITS-PWP-87-6.

(56) References Cited

OTHER PUBLICATIONS

Answer, Affirmative Defenses, and Counterclaims by Defendant Westwood One, Inc., to Plaintiff Triangle Software, LLC's Complaint for Patent Infringement, Mar. 11, 2011.
Answer and Counterclaims of TomTom, Inc. to Plaintiff Triangle Software, LLC's Complaint for Patent Infringement, May 16, 2011.
Amended Answer and Counterclaims of TomTom, Inc. to Plaintiff Triangle Software, LLC's Complaint for Patent Infringement, Mar. 16, 2011.
Attachment A of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 6 pages.
Attachment B of Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 618 pages.
Audi-V150 Manual, Oct. 2001, 152 pages, Japan.
Balke, K.N., "Advanced Technologies for Communicating with Motorists: A Synthesis of Human Factors and Traffic Management Issues," Report No. FHWA/TX-92/1232-8, May 1992, Texas Department Transportation, Austin, TX, USA, 62 pages.
Barnaby J. Feder, "Talking Deals; Big Partners in Technology," Technology, The New York Times, Sep. 3, 1987.
Birdview Navigation System by Nissan Motor Corp, 240 Landmarks of Japanese Automotive Technology, 1995, 2 pages, Society of Automotive Engineers of Japan, Inc., Japan.
Blumentritt, K. et al., "Travel System Architecture Evaluation," Publication No. FHWA-RD-96-141, Jul. 1995, 504 pages, U.S. Department of Transportation, McLean, VA, USA.
Brooks, et al., "Turn-by-Turn Displays versus Electronic Maps: An On-the-Road Comparison of Driver Glance Behavior," Technical Report, The University of Michigan, Transportation Research Institute (UMTRI), Jan. 1999.
Burgett, A.L., "Safety Evaluation of TravTek," Vehicle Navigation & Information Systems Conference Proceedings (VNIS'91), P-253, Part 1, Oct. 1991, pp. 819-825, Soc. of Automotive Engineers, Inc., Warrendale, PA, USA.
Campbell, J.L. "Development of Human Factors Design Guidelines for Advanced Traveler Information Systems (ATIS)", Proceedings Vehicle Navigation and Information Systems Conference, 1995, pp, 161-164, IEEE, New York, NY, USA.
Campbell, J.L. "Development of Human Factors Design Guidelines for Advanced Traveler Information Systems (ATIS) and Commercial Vehicle Operations (CVO)", Publication No. FHWA-RD-98-057, Report Date Sep. 1998, 294, pages, U.S. Department of Transportation, McLean, VA 22010-2296.
Carin Navigation System Manual and Service Manual for Model Carin 22SY520, 75 pages, Philips Car Systems, The Netherlands, [date unknown].
Cathey, F.W. et al., "A Prescription for Transit Arrival/Department Prediction Using Automatic Vehicle Location Data," Transportation Research Part C 11, 2003, pp. 241-264, Pergamon Press Ltd., Elsevier Ltd., U.K.
Chien, S.I. et al., "Predicting Travel Times for the South Jersey Real-Time Motorist Information System," Transportation Research Record 1855, Paper No. 03-2750, Revised Oct. 2001, pp. 32-40.
Chira-Chavala, T. et al., "Feasibility Study of Advanced Technology HOV Systems," vol. 3: Benefit Implications of Alternative Policies for Including HOV lanes in Route Guidance Networks, Dec. 1992, 84 ages, UCB-ITS-PRR-92-5 PATH Research Report, Inst. of Transportation Studies, Univ. of Calif., Berkeley, USA.
Clark, E.L., Development of Human Factors Guidelines for Advanced Traveler Information Systems (ATIS) and Commercial Vehicle Operations (CVO): Comparable Systems Analysis, Dec. 1996, 199 pages.
Dancer, F. et al., "Vehicle Navigation Systems: Is America Ready?," Navigation and Intelligent Transportation System, Automotive Electronics Series, Society of Automotive Engineers, 1998, pp. Cover page, Table of Contents pp. 3-8.
Davies, P. et al., "Assessment of Advanced Technologies for Relieving Urban Traffic Congestion" National Cooperative Highway Research Program Report 340, Dec. 1991, 106 pages.
de Cambray, B. "Three-Dimensional (3D) Modeling in a Geographical Database," Auto-Carto'11, Eleventh International Conference on Computer Assisted Cartography, Oct. 30, 1993-Nov. 1, 1993, pp. 338-347, Minneapolis, USA.
Declaration Under 37 C.F.R. 1.131 and Source Code from U.S. Appl. No. 10/897,550, Oct. 27, 2008.
Dillenburg, J.F. et al., "The Intelligent Travel Assistant," IEEE 5th International Conference on Intelligent Transportation Systems, Sep. 3-6, 2002, pp. 691-696, Singapore.
Dingus, T.A. et al., "Human Factors Engineering the TravTek Driver Interface," Vehicle Navigation & Information System Conference Proceedings (VNIS'91), P-253, Part 2, Oct. 1991, pp. 749-755, Soc. of Automotive Engineers, Inc., Warrendale, PA, USA.
Endo, et al., "Development and Evaluation of a Car Navigation System Providing a Birds Eye View Map Display," Navigation and Intelligent Transportation Systems, Automotive Electronics Series, Society of Automotive Engineers, 1998, pp. Cover page, Table of Contents, pp. 19-22.
Eppinger, A. et al., "Dynamic Route Guidance—Status and Trends," Convergence 2000 International Congress on Transportation Electronics, Oct. 16-18, 1999, 7 pages, held in Detroit, MI, SAE International Paper Series, Warrendale, PA, USA.
Expert Report of Dr. Michael Goodchild Concerning the Validity of U.S. Pat. No. 5,938,720 dated Jun. 16, 2011 in *Triangle Software, LLC v. Garmin International Inc. et al.*, in the United States District Court for the Eastern District of Virginia, Alexandria Division, Case No. 1:10-cv-1457-CMH-TCB, 16 pages.
Fawcett, J., "Adaptive Routing for Road Traffic," IEEE Computer Graphics and Applications, May/Jun. 2000, pp. 46-53, IEEE, New York, NY, USA.
Fleischman, R.N., "Research and Evaluation Plans for the TravTek IVHS Operational Field Test,"Vehicle Navigation & Information Systems Conference Proceedings (VNIS'91), P-253, Part 2, Oct. 1991, pp. 827-837, Soc. of Automotive Engineers, Inc., Warrendale, PA, USA.
Garmin International, Inc.'s Answer and Counterclaims to Triangle Software, LLC's Complaint, Feb. 24, 2011.
Garmin International, Inc.'s Amended Answer and Counterclaims to Triangle Software, LLC's Complaint, Mar. 16, 2011.
Garmin International, Inc. and Garmin USA, Inc.'s Answer and Counterclaim to Triangle Software, LLC's Supplemental Complaints filed Jun. 17, 2011 in *Triangle Software, LLC v. Garmin International Inc. et al.*, in the United States District Court for the Eastern District of Virginia, Alexandria Division, Case No. 1:10-cv-1457-CMH-TCB, 36 pages.
Garmin's Preliminary Invalidity Contentions and Certificate of Service filed May 16, 2011 in *Triangle Software, LLC. V. Garmin International, Inc. et al.*, Case No. 1: 10-cv-1457-CMH-TCB in the United States District Court for the Eastern District of Virginia, Alexandria Division, 46 pages.
Goldberg et al., "Computing the Shortest Path: A* Search Meets Graph Theory," Proc. of the 16th Annual ACM-SIAM Sym. on Discrete Algorithms, Jan. 23-25, 2005. Vancouver, BC.
Goldberg et al., "Computing the Shortest Path: A* Search Meets Graph Theory," Microsoft Research, Technical Report MSR-TR-2004 Mar. 24, 2003.
Golisch, F., Navigation and Telematics in Japan, International Symposium on Car Navigation Systems, May 21, 1997, 20 pages, held in Barcelona, Spain.
GM Exhibits Prototype of TravTek Test Vehicle, Inside IVHS, Oct. 28, 1991, V. 1, No. 21, 2 pages.
Gueziec, Andre, "3D Traffic Visualization in Real Time," ACM Siggraph Technical Sketches, Conference Abstracts and Applications, p. 144, Los Angeles, CA, Aug. 2001.
Gueziec, A., "Architecture of a System for Producing Animated Traffic Reports," Mar. 30, 2011, 42 pages.

(56) References Cited

OTHER PUBLICATIONS

Handley, S. et al., "Learning to Predict the Duration of an Automobile Trip," Proceedings of the Fourth International Conference on Knowledge Discovery and Data Mining, 1998, 5 pages, AAAI Press, New York, NY, USA.

Hankey, et al., "In-Vehicle Information Systems Behavioral Model and Design Support: Final Report," Feb. 16, 2000, Publication No. 00-135, Research, Development, and Technology, Turner-Fairbank Highway Research Center, McLean, Virginia.

Hirata et al., "The Development of a New Multi-AV System Incorporating an On-Board Navigation Function," International Congress and Exposition, Mar. 1-5, 1993, pp. 1-12, held in Detroit, MI, SAE International, Warrendale, PA, USA.

Hoffmann, G. et al., Travel Times as a Basic Part of the LISB Guidance Strategy, Third International Conference on Road Traffic Control, May 1-3, 1990, pp. 6-10, London, U.K.

Hoffmann, T., "2005 Acura RL Prototype Preview," Auto123.com, 4 pages.

Hu, Z. et al., "Real-time Data Fusion on Tracking Camera Pose for Direct Visual Guidance," IEEE Vehicles Symposium, Jun. 14-17, 2004, pp. 842-847, held in Parma, Italy.

Huang, Tsan-Huang, Chen, Wu-Cheng; "Experimental Analysis and Modeling of Route Choice with the Revealed and Stated Preference Data" Journal of the Eastern Asia Society for Transportation Studies, vol. 3, No. 6, Sep. 1999—Traffic Flow and Assignment.

Hulse, M.C. et al., "Development of Human Factors Guidelines for Advanced Traveler Information Systems and Commercial Vehicle Operations: Identification of the Strengths and Weaknesses of Alternative Information Display Formats," Publication No. FHWA-RD-96-142, Oct. 16, 1998, 187 pages, Office of Safety and Traffic Operation R&D, Federal Highway Administration, USA.

Initial Expert Report of Roy Summer dated Jun. 16, 2011 in *Triangle Software, LLC v. Garmin International Inc. et al.*, in the United States District Court for the Eastern District of Virginia, Alexandria Division, Case No. 1:10-cv-1457-CMH-TCB, 289 pages.

Initial Expert Report of William R. Michalson, Ph.D. dated Jun. 17, 2011 in *Triangle Software, LLC v. Garmin International Inc. et al.*, in the United States District Court for the Eastern District of Virginia, Alexandria Division, Case No. 1:10-cv-1457-CMH-TCB, 198 pages.

Inman, V.W., et al., "TravTek Global Evaluation and Executive Summary," Publication No. FHWA-RD-96-031, Mar. 1996, 104 pages, U.S. Department of Transportation, McLean, VA, USA.

Inman, V.W., et al., "TravTek Evaluation Rental and Local User Study," Publication No. FHWA-RD-96-028, Mar. 1996, 110 pages, U.S. Department of Transportation, McLean, VA, USA.

Jiang, G., "Travel-Time Prediction for Urban Arterial Road: A Case on China," Proceedings Intelligent Transportation Systems, Oct. 12-15, 2003, pp. 255-260, IEEE, New York, NY, USA.

Karabassi, A. et al., "Vehicle Route Prediction and Time and Arrival Estimation Techniques for Improved Transportation System Management," in Proceedings of the Intelligent Vehicles Symposium, 2003, pp. 511-516, IEEE, New York, NY, USA.

Koller, D. et al., "Virtual GIS: A Real-Time 3D Geographic Information System," Proceedings of the 6th IEEE Visualization Conference (Visualization 95) 1995, pp. 94-100, IEEE, New York, NY, USA.

Kopitz et al., Table of Contents, Chapter 6, Traffic Information Services, and Chapter 7, Intelligent Transport Systems and RDS-TMC in RDS: The Radio Data System, 1992, Cover page-XV, pp. 107-167, Back Cover page, Artech House Publishers, Boston, USA and London, Great Britain.

Krage, M.K., "The TravTek Driver Information System," Vehicle Navigation & Information Systems Conference Proceedings (VNIS'91), P-253, Part 1, Oct. 1991, pp. 739-748, Soc. of Automotive Engineers, Inc., Warrendale, PA, USA.

Ladner, R. et al., "3D Mapping of Interactive Synthetic Environment," Computing Practices, Mar. 2000, pp. 33-39, IEEE, New York, NY, USA.

Levinson, D., "Assessing the Benefits and Costs of Intelligent Transportation Systems: The Value of Advanced Traveler Information System," Publication UCB-ITS-PRR-99-20, California Path Program, Jul. 1999, Institute of Transportation Studies, University of California, Berkeley, CA, USA.

Lowenau, J., "Final Map Actualisation Requirements," Version 1.1, ActMAP Consortium, Sep. 30, 2004, 111 pages.

Meridian Series of GPS Receivers User Manual, Magellan, 2002, 106 pages, Thales Navigation, Inc., San Dimas, CA, USA.

Ness, M., "A Prototype Low Cost In-Vehicle Navigation System," IEEE-IEE Vehicle Navigation & Information Systems Conference (VNIS), 1993, pp. 56-59, New York, NY, USA.

N'Fit Xanavi, unknown date, 94 pages, Japana, Date of Download: May 17, 2013.

Nintendo Wii Operations Manual Systems Setup. 2009.

Nissan Automobile Navigation System User Manual, [date unknown], 163 pages. Date of Download: May 17, 2013.

Noonan, J., "Intelligent Transportation Systems Field Operational Test Cross-Cutting Study Advanced Traveler Information Systems," Sep. 1998, 27 pages, U.S. Department of Transportation, McLean, VA, USA.

Odagaki et al., Automobile Navigation System with Multi-Source Guide Information, International Congress & Exposition, Feb. 24-28, 1992, pp. 97-105. SAE International, Warrendale, PA, USA.

Panasonic Portable Navigation System User Manual for Products KX-GT30, KX-GT30X, and KX-GT3OZ, Cover page, pp. 1-5, 132-147, End pages, Matsushita Denki Sangyo K.K., Fukuoka City, Japan [Date Unknown].

Preliminary Invalidity Contentions of Defendant TomTom, Inc., Certificate of Service and Exhibit A filed May 16, 2011 in *Triangle Software, LLC. V. Garmin International, Inc. et al.*, Case No. 1:10-cv-1457-CMH-TCB in the United States District Court for the Eastern District of Virginia, Alexandria Division, 354 pages.

Raper, J.F., "Three-Dimensional GIS," in Geographical Information Systems: Principles and Applications, 1991, vol. 1, Chapter 20, 21 pages.

"Reference Manual for the Magellan RoadMate 500/700." 2003, 65 pages, Thales Navigation, Inc., San Dimas, CA, USA.

Riiett, L.R., "Simulating the TravTek Route Guidance Logic Using the Integration Traffic Model," Vehicle Navigation & Information System, P-253, Part 2, Oct. 1991, pp. 775-787, Soc. of Automotive Engineers, Inc., Warrendale, PA, USA.

Rillings, J.H., "Advanced Driver Information Systems," IEEE Transactions on Vehicular Technology, Feb. 1991, vol. 40, No. 1, pp. 31-40, IEEE, New York, NY, USA.

Rillings, J.H., "TravTek," Vehicle Navigation & Information System Conference Proceedings (VNIS'91), P-253, Part 2, Oct. 1991, pp. 729-737, Soc. of Automotive Engineers, Inc., Warrendale, PA, USA.

Rockwell, Mark, "Telematics Speed Zone Ahead," Wireless Week, Jun. 15, 2004, Reed Business Information, http://www.wirelessweek.com.

Rupert, R.L., "The TravTek Traffic Management Center and Traffic Information Network," Vehicle Navigation & Information System Conference Proceedings (VNIS'91), P-253, Part 1, Oct. 1991, pp. 757-761, Soc. of Automotive Engineers, Inc., Warrendale, PA, USA.

Schofer, J.L., "Behavioral Issues in the Design and Evaluation of Advanced Traveler Information Systems," Transportation Research Part C 1, 1993, pp. 107-117, Pergamon Press Ltd., Elsevier Science Ltd.

Schulz, W., "Traffic Management Improvement by Integrating Modem Communication Systems," IEEE Communications Magazine, Oct. 1996, pp. 56-60, New York, NY, USA.

Shepard, I.D.H., "Information Integration and GIS," in Geographical Information Systems: Principles and Applications, 1991, vol. 1, pp. Cover page, 337-360, end page.

Sirius Satellite Radio: Traffic Development Kit Start Up Guide, Sep. 27, 2005, Version 00.00.01, NY, New York, 14 pages.

Slothhower, D., "Sketches & Applications," SIGGRAPH 2001, pp. 138-144, Stanford University.

(56) References Cited

OTHER PUBLICATIONS

Sumner, R., "Data Fusion in Pathfinder and TravTek," Part 1, Vehicle Navigation & Information Systems Conference Proceedings (VNIS'91), Oct. 1991, Cover & Title page, pp. 71-75.
Supplemental Expert Report of William R. Michalson, PH.D. Regarding Invalidity of the Patents-in-Suit dated Jul. 5, 2011 in *Triangle Software, LLC v. Garm in International Inc. et al.*, in the United States District Court for the Eastern District of Virginia, Alexandria Division, Case No. 1:10-cv-1457-CMH-TCB, 23 pages.
Tamuara et al., "Toward Realization of VICS—Vehicle Information and Communications System," IEEE-IEE Vehicle Navigation & Information Systems Conference (VNIS'93), 1993, pp. 72-77, held in Ottawa, Canada.
Taylor, K.B., "TravTek-Information and Services Center," Vehicle Navigation & Information System Conference Proceedings (VNIS'91), P-253, Part 2, Oct. 1991, pp. 763-774, Soc. of Automotive Engineers, Inc., Warrendale, PA, USA.
Texas Transportation Institute, "2002 Urban Mobility Study: 220 Mobility Issues and Measures: The Effects of Incidents—Crashes and Vehicle Breakdowns" (2002).
"The Challenge of VICS: The Dialog Between the Car and Road has Begun," Oct. 1, 1996, pp. 19-63, The Road Traffic Information Communication System Centre (VICS Centre), Tokyo, Japan.
Thompson, S.M., "Exploiting Telecommunications to Delivery Real Time Transport Information," Road Transport Information and Control, Conf. Publication No. 454, Apr. 21-23, 1998, pp. 59-63, IEE, U.K.
Tonjes, R., "3D Reconstruction of Objects from Ariel Images Using a GIS," presented at ISPRS Workshops on "Theoretical and Practical Aspects of Surface Reconstructions and 3D Object Extraction" Sep. 9-11, 1997, 8 pages, held in Haifa, Israel.
"Travtek Information and Services Center Policy/Procedures Manual," Feb. 1992, 133 pages, U.S. Department of Transportation, McLean, VA, USA.
Truett, R., "Car Navigation System May Live on After Test," The Orlando Sentinel, Feb. 17, 1993, p. 3 pages.
U.S. Dept. of Transportation, Closing the Data Gap: Guidelines for Quality Advanced Traveler Information System (ATIS) Data, Version 1.0, Sep. 2000, 41 pages.
User Guide of Tom Tom ONE; 2006.
Supplemental Expert Report of William R. Michalson, PH.D. Regarding Invalidity of the Patents-in-Suit dated Jul. 5, 2011 in *Triangle Software, LLC v. Garmin International Inc. et al.*, in the United States District Court for the Eastern District of Virginia, Alexandria Division, Case No. 1:10-cv-1457-CMH-TCB, 23 pages.
Volkswagen Group of America, Inc.'s Answer and Counterclaim, Feb. 24, 2011.
Watanabe, M. et al., "Development and Evaluation of a Car Navigation System Providing a Bird's-Eye View Map Display," Technical Paper No. 961007, Feb. 1, 1996, pp. 11-18, SAE International.
Wischhof, L. et al., "SOTIS—A Self-Organizing Traffic Information System," Proceedings of the 57th IEEE Vehicular Technology Conference (VTC—03), 2003, pp. 2442-2446, New York, NY, USA.
WSI, "TrueView Interactive Training Manual, Showfx Student Guide," Print Date: Sep. 2004, Document Version: 4.3x. Link: http://apollo.Isc.vsc.edu/intranet/WSI_Showfx/training/970-TVSK-SG-43.pdf.
XM Radio Introduces Satellite Update Service for Vehicle Navigation, Apr. 8, 2004, 2 pages.
Yang, Qi; "A Simulation Laboratory for Evaluation of Dynamic Traffic Management Systems", Massachusetts Institute of Technology, Jun. 1997.
Yim et al., TravInfo. Field Operational Test Evaluation "Evaluation of Travinfo Field Operation Test" Apr. 25, 2000.
Yim et al., "TravInfo Field Operational Test Evaluation: Information Service Providers Customer Survey", May 1, 2000.
Yokouchi, K., "Car-Navigation Systems," Mitsubishi Electr. Adv. Technical Reports, 2000, vol. 91, pp. 10-14, Japan.
You, J. et al., "Development and Evaluation of a Hybrid Travel Time Forecasting Model," Transportation Research Parc C 9, 2000, pp. 231-256, Pergamon Press Ltd., Elsevier Science Ltd., U.K.
Zhao, Y., "Vehicle Location and Navigation Systems," 1997, 370 pages, Arthech House, Inc., Norwood, MA, USA.
Zhu, C. et al. "3D Terrain Visualization for Web GIS," Center for Advance Media Technology, Nanyang Technological University, Singapore, 2003, 8 pages.
PCT Application No. PCT/US2004/23884, Search Report and Written Opinion mailed Jun. 17, 2005.
PCT Application No. PCT/US2011/48680, Search Report and Written Opinion mailed Feb. 7, 2012.
PCT Application No. PCT/US2011/51647, Search Report and Written Opinion mailed Feb. 2, 2012.
PCT Application No. PCT/US2011/60663, Search Report and Written Opinion mailed May 31, 2012.
PCT Application No. PCT/US2012/38702, Search Report and Written Opinion mailed Aug. 24, 2012.
PCT Application No. PCT/US2013/23505, Search Report and Written Opinion mailed May 10, 2013.
U.S. Appl. No. 12/398,120, Final Office Action mailed Mar. 26, 2013.
U.S. Appl. No. 12/398,120, Office Action mailed Nov. 14, 2012.
U.S. Appl. No. 12/398,120, Final Office Action mailed Apr. 12, 2012.
U.S. Appl. No. 12/398,120, Office Action mailed Nov. 15, 2011.
U.S. Appl. No. 14/100,985, Final Office Action mailed Mar. 25, 2015.
U.S. Appl. No. 14/100,985, Office Action mailed Sep. 23, 2014.
U.S. Appl. No. 10/897,550, Office Action mailed Jun. 12, 2009.
U.S. Appl. No. 10/897,550, Office Action mailed Jan. 21, 2009.
U.S. Appl. No. 10/897,550, Office Action mailed Aug. 1, 2008.
U.S. Appl. No. 10/897,550, Office Action mailed Oct. 3, 2007.
U.S. Appl. No. 12/283,748, Office Action mailed Aug. 20, 2009.
U.S. Appl. No. 12/283,748, Office Action mailed Mar. 11, 2009.
U.S. Appl. No. 12/763,199, Final Office Action mailed Nov. 1, 2010.
U.S. Appl. No. 12/763,199, Office Action mailed Aug. 5, 2010.
U.S. Appl. No. 13/316,250, Final Office Action mailed Jun. 24, 2013.
U.S. Appl. No. 13/316,250, Office Action mailed Jan. 18, 2013.
U.S. Appl. No. 13/296,108, Final Office Action mailed Oct. 25, 2013.
U.S. Appl. No. 13/296,108, Office Action mailed May 9, 2013.
U.S. Appl. No. 14/265,290, Office Action mailed Jul. 23, 2015.
U.S. Appl. No. 10/379,967, Final Office Action mailed May 11, 2005.
U.S. Appl. No. 10/379,967, Office Action mailed Sep. 20, 2004.
U.S. Appl. No. 11/509,954, Office Action mailed Nov. 23, 2007.
U.S. Appl. No. 11/751,628, Office Action mailed Jan. 29, 2009.
U.S. Appl. No. 12/967,045, Final Office Action mailed Jun. 27, 2012.
U.S. Appl. No. 12/967,045, Office Action mailed Jul. 18, 2011.
U.S. Appl. No. 13/561,269, Office Action mailed Dec. 13, 2012.
U.S. Appl. No. 13/561,327, Office Action mailed Oct. 26, 2012.
U.S. Appl. No. 13/747,454, Office Action mailed Jun. 17, 2013.
U.S. Appl. No. 14/327,468, Final Office Action mailed Aug. 4, 2015.
U.S. Appl. No. 14/327,468, Office Action mailed Mar. 12, 2015.
U.S. Appl. No. 13/475,502, Final Office Action mailed Sep. 10, 2013.
U.S. Appl. No. 13/475,502, Office Action mailed Apr. 22, 2013.
U.S. Appl. No. 13/752,351, Office Action mailed Jul. 22, 2013.
U.S. Appl. No. 14/323,352, Final Office Action mailed Apr. 3, 2015.
U.S. Appl. No. 14/323,352, Office Action mailed Nov. 26, 2014.
U.S. Appl. No. 14/058,195, Office Action mailed Aug. 4, 2015.
U.S. Appl. No. 14/058,195, Final Office Action mailed Apr. 8, 2015.
U.S. Appl. No. 14/058,195, Office Action mailed Nov. 12, 2014.
U.S. Appl. No. 12/860,700, Final Office Action mailed Jul. 22, 2014.
U.S. Appl. No. 12/860,700, Office Action mailed Apr. 3, 2014.
U.S. Appl. No. 12/860,700, Final Office Action mailed Jun. 26, 2013.
U.S. Appl. No. 12/860,700, Office Action mailed Feb. 26, 2013.

(56) References Cited

OTHER PUBLICATIONS

U.S. Appl. No. 12/881,690, Office Action mailed Sep. 3, 2014.
U.S. Appl. No. 12/881,690, Final Office Action mailed May 21, 2014.
U.S. Appl. No. 12/881,690, Office Action mailed Jan. 9, 2014.
U.S. Appl. No. 12/881,690, Final Office Action mailed Aug. 9, 2013.
U.S. Appl. No. 12/881,690, Office Action mailed Apr. 22, 2013.
EP Patent Application No. 12785688.8 Extended European Search Report dated Aug. 12, 2015.
U.S. Appl. No. 14/100,985, Office Action mailed Oct. 1, 2015.
Canada Patent Application No. 2,688,129 Office Action dated Jan. 18, 2016.
U.S. Appl. No. 15/218,619, Andre Gueziec, Method for Predicting a Travel Time for a Traffic Route.
U.S. Appl. No. 15/077,880, Office Action mailed Jul. 21, 2016.
U.S. Appl. No. 14/265,290, Final Office Action mailed Jan. 29, 2016.
U.S. Appl. No. 14/624,498, Office Action mailed Feb. 18, 2016.
U.S. Appl. No. 14/058,195, Final Office Action mailed Mar. 1, 2016.
U.S. Appl. No. 14/726,858 Office Action mailed Feb. 22, 2016.
U.S. Appl. No. 15/181,221, Andre Gueziec, GPS Generated Traffic Informtion, filed Jun. 13, 2016.
U.S. Appl. No. 15/207,377, Andre Gueziec, System for Providing Traffic Data and Driving Efficiency Date.
U.S. Appl. No. 15/077,880, J.D. Margulici, Estimating Time Travel Distributions on Signalized Arterials, Mar. 22, 2016.
Coifman, Benjamin; "Vehicle Reidentification and Travel Time Measurement on Congested Freeeways", Journal of Transportation Engineering, Oct. 1, 1999; pp. 475-483.
EP Patent Application No. 1740931.4 Extended European Search Report dated Apr. 19, 2016.
U.S. Appl. No. 15/181,221 Office Action mailed Aug. 11, 2016.
U.S. Appl. No. 14/637,357, Office Action mailed Aug. 23, 2016.
U.S. Appl. No. 14/726,858 Final Office Action mailed Sep. 8, 2016.
U.S. Appl. No. 15/270,916, Andre Gueziec, Controlling A Three-Dimensional Virtual Broadcast Presentation.
U.S. Appl. No. 14/265,290, Final Office Action mailed Oct. 19, 2016.

* cited by examiner

SYSTEM AND METHOD FOR DELIVERING DEPARTURE NOTIFICATIONS

CROSS-REFERENCE TO RELATED APPLICATIONS

The present application is a continuation and claims the priority benefit of U.S. patent application Ser. No. 14/155,174 filed Jan. 14, 2014, now U.S. Pat. No. 9,127,959 which is a continuation and claims the priority benefit of U.S. patent application Ser. No. 13/316,250 filed Dec. 9, 2011, now U.S. Pat. No. 8,660,780, which is a continuation and claims the priority benefit of U.S. patent application Ser. No. 12/763,199 filed Apr. 19, 2010, now U.S. Pat. No. 8,103,443, which is a continuation and claims the priority benefit of U.S. patent application Ser. No. 12/283,748 filed Sep. 12, 2008, now U.S. Pat. No. 7,702,452, which is a continuation and claims the priority benefit of U.S. patent application Ser. No. 10/897,550 filed Jul. 23, 2004, now U.S. Pat. No. 7,610,145, which claims the priority benefit of U.S. provisional application 60/490,199 filed Jul. 25, 2003. The disclosures of the foregoing are incorporated herein by reference.

BACKGROUND OF THE INVENTION

Field of the Invention

The present invention relates to the field of time-management for road travelers and vehicles, and more particularly, to determining departure times to allow for on-time arrivals at particular locations based on evaluation of historic, present, and predicted road conditions.

Description of the Related Art

Recent studies have found that road travelers can spend almost 50% of their commute time 'stuck' in traffic, that is, not making significant progress on traversing a total distance to their final destination. This unfortunate phenomenon is sometimes referred to as 'grid lock.' Grid lock is often exacerbated, if not caused by, road construction, high traffic volume related to 'rush hour,' or otherwise resulting from special events such as concerts and holiday traffic or, as is most often the case, accidents on a roadway resulting in road or lane closures.

Further studies have demonstrated that daily commuters account for over 75% of all car trips. With increasing urban-sprawl, most road travelers are commuters with increasingly significant distances to travel. Combined with the fact that almost 90% of daily commuters in the United States, for example, use private vehicles and therein represent millions of people wanting to move at the same time, road systems in the United States and around the world simply do not have the capacity to handle peak loads of traffic. Traffic congestion has become, unfortunately, a way of life.

Road travelers are, as a result, often vulnerable when making travel plans in that they do not know what to expect in terms of traffic conditions or commute time on any given day. Poor and inconsistent traffic information combined with the road traveler's general inability to process multiple feeds of incoming real time and historical data as it relates to weather, incident reports, time of year, construction road closures, and special events further complicate these problems.

Road travelers are reduced to making inaccurate predictions as to required travel time necessary to traverse from a point of departure to a desired point of arrival. Furthermore, road travelers, due in part to constantly changing weather and traffic conditions, are often unaware that more optimal travel routes might exist both prior to departure and while en route to the desired point of arrival.

Present systems inform the road traveler of actual conditions on a variety of routes, but leave determination of an ultimate travel route and necessary departure time to the road traveler, which inevitably results in the aforementioned inaccurate predictions.

For example, U.S. Pat. No. 6,594,576 to Fan et al. provides a traffic data compilation computer that determines present traffic conditions and a fastest route to a particular location under the aforementioned traffic conditions. Fan et al. also provides estimated travel time based on current traffic conditions. Fan et al. fails, however, to provide a necessary departure time to the road traveler so that they may achieve an on-time arrival. Fan et al. also fails to consider historical traffic data in that present conditions may allow for a given travel time but fails to predict a change in that travel time due to a known forthcoming event such as rush hour or a concert. Furthermore, Fan et al. requires the presence of a collection of data from mobile units—vehicles. Absent large scale cooperation of road travelers to equip their vehicles with such data collection equipment, the data collection network of Fan et al. might also produce inaccurate or, at least, incomplete information.

U.S. Pat. No. 6,236,933 to Lang is also representative of the lack of a means to inform road travelers of both evolving road conditions, travel routes, and the necessary departure time on any one of those routes in order to achieve on-time arrival. Lang, too, is dependent upon widespread installation of monitoring electronic devices in each road traveler's vehicle.

There is the need for a system that aggregates multiple sources of traffic data and interprets that traffic data to express it as a predictive road speed and not a static route devoid of considerations of constantly evolving traffic conditions. By overlaying predictive road speeds with a road traveler's starting locating, destination, desired arrival time and other optional attributes, a road traveler is offered a much needed system that determines an optimal route and recommended departure time. Such a system would then deliver the information via a desired message delivery method. Such a system should also remain sensitive of privacy concerns of road travelers in that the presence of a monitoring device might be considered invasive and otherwise outweighs any benefits it might offer in providing predictive road speed.

SUMMARY OF THE PRESENTLY CLAIMED INVENTION

The present invention is directed towards a system and method for aggregating and interpreting multiple sources of traffic data. The present invention expresses that data as a predictive road speed for particular sections of road. By determining predictive road speed, the present invention determines the optimal travel route and recommended departure time based on, among other things, destination, and arrival time and changing traffic conditions. The present invention also provides for communication of the optimal departure time to the traveler.

In one embodiment, the road traveler inputs a starting location, a destination, a desired arrival time, and other optional attributes such as maximum desired speed and vehicle type, which may be used by a routing application to calculate a route. The road traveler also inputs information regarding a desired message delivery method such as electronic mail, SMS, telephone, instant message or other message delivery protocol. Using a database of predictive road speeds and a routing engine, the system determines the optimal route and recommended departure time for the road traveler's pre-selected arrival time. The system then delivers this information to the road traveler through the desired message delivery protocol.

Prior to departure, the system continues to re-evaluate the suggested route and estimated travel time using constantly updating road speed forecasts, and delivers alerts to the road traveler when there is a significant change in the recommended route or forecast. A departure and route alert is also sent when the recommended departure time is reached. Updates may also be sent after the departure time to update the road traveler as to changes in the predicted arrival time or recommended route.

By aggregating multiple sources of data, that data can then be interpreted as a predictive road speed. When the predictive speed is overlaid with a road traveler's attributes, the optimal route and departure time along with real-time updates can be delivered to a road traveler. The availability of such information can significantly reduce commute time, especially time spent in traffic, thereby resulting in increased on-time arrival and an overall reduction of stress on transportation infrastructure.

The benefits of the present system include availability of scheduled and, as necessary, up-to-the-minute/emergency departure notifications. The present system is also beneficial in that it provides data for a desired route, as opposed to a variety of routes which forces the user to make inaccurate and often erroneous calculations by combining disparate data.

The present system provides further benefits in that incident reports, weather and time of year are used in backward-looking algorithms to determine new variables that perturb otherwise stable traffic patterns.

DETAILED DESCRIPTION

In accordance with one embodiment of the present invention, a system sends departure notifications to road travelers as to an optimal departure time for a pre-selected travel path to allow for an on-time arrival. This notification takes into account road speed forecasts for the pre-selected travel path and provides updated departure recommendations based on changing traffic conditions. The system aggregates road and other travel data in various forms and formats and expresses it in an average speed for a section or sections of roadway. By overlaying predictive road speeds, for, example with a road traveler's starting location, destination, desired speed, and arrival time, the system evaluates a suggested route and delivers notification to the road traveler as to recommended departure time and route.

Figure 1:
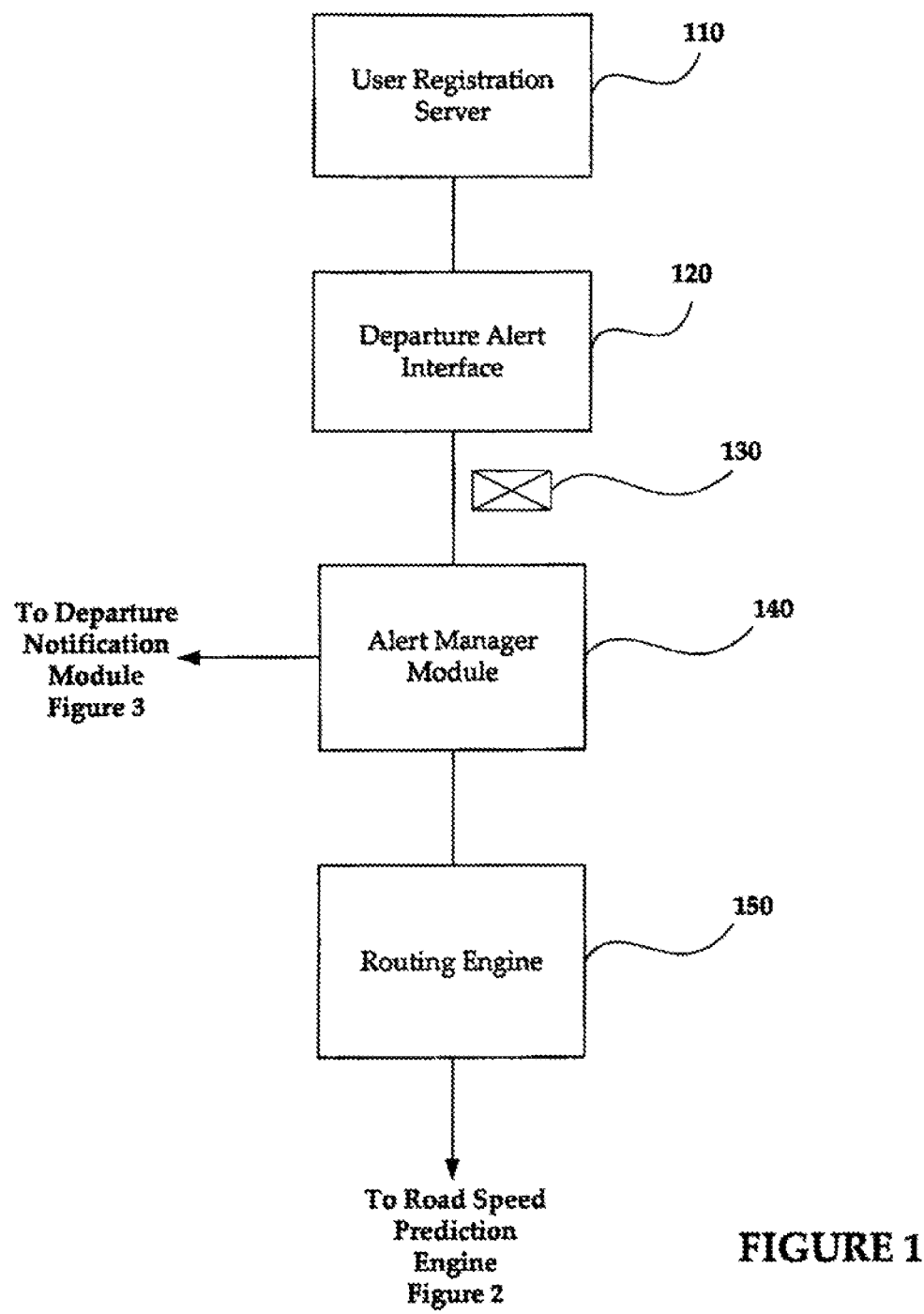
FIG. 1 shows a system for generation of a departure alert.

FIG. 1 illustrates a portion of an exemplary system (FIG. 8) for calculating departure notices whereby a road traveler or a user logs in to the system through, at least, a user registration server 110. The term "user," as used throughout the specification, should be understood to cover a person actually using or interfacing the system (a user, in the truest sense) in addition to a person who might be receiving information from the system while traveling in a vehicle (a road traveler).

In particular, FIG. 1 illustrates with greater particularity that part of a larger system for generating a departure alert 130 whereby a user logs in to the system through, at least, a user registration server 110. The user registration server 110 manages, at least, user identification and authentication but can also manage related processes such as subscriptions and billing. User registration server 110 may contain a database for maintaining, for example, user identification information. At the very least, however, user registration server 110 has means to access, for example, a separate database storing this type of information. The user registration server 110 may also manage commonly used information about a particular user including regularly traveled routes, a preferred notification method, credit card information, and so forth.

The user registration server 110 may also be integrated with architecture of third-party service providers (not shown) such as Internet portals, cellular telephone services, and wireless handheld devices. Such integration allows the present system to deliver departure alerts 130 and notifications 320 through third-party proprietary networks or communication systems, such as instant messaging networks operated AOL®, Yahoo!® and Microsoft®, in addition to providing a value-added resale benefit to be offered by such third-party providers. Departure alerts 130 and departure notifications 320 generated by the present system and integrated with architecture of a third-party can also be charged to a user's third-party service bill (e.g., a wireless telephone bill), and the operator of the present system shares a portion of the third-party service provider's revenue.

Departure alerts 130 and departure notifications 320 generated by the present system can also be charged and/or billed to the user directly by the operator of the system instead of through or by a third-party. For example, a credit card registered and saved to an account by the user can be charged every time a departure alert 130 or a departure notification 320 is generated. Various alternative means of payment and billing exist including pre-purchasing a specific number of departure alerts 130 or departure notifications 320.

The user registration server 110, in some embodiments of the present invention, may be optional. In embodiments omitting the user registration server 110, anonymous users can access the system but risk the loss of certain functionalities. Examples of such a loss of functionality are evidenced in there being no extended retention of personal driving or travel preferences or account information as is explained in detail below.

The user registration server 110 accepts information from a user, which may include a 'user name' or other means of identifying the user, in addition to a 'password' or some other form of security verification information whereby the user registration server 110 may verify if the user is who they contend to be. For example, a user might provide a user name and password combination of 'johndoe' and 'abc123.' The user registration server 110 will then access the database or other means of storing this information to verify if a user identifying himself as 'johndoe' is, in fact, authorized to access the present system via a prior account registration or generation. If so, 'johndoe' is authorized, the user registration server 110 further verifies whether the present user is, in fact, 'johndoe' by verifying whether the password immediately provided (e.g., 'abc123') is the same password as that provided during a registration or initial account generation process as evidencing a right or permission to access the present system account.

Access to the user registration server 110 to verify account access permissions or to otherwise provide, edit, or delete certain information may occur via any number of different interfaces. For example, if the user registration server 110 is integrated with third-party architecture such as Yahoo! ®, interface with the user registration server 110 may occur through a third-party web-based user interface specifically generated and designed by Yahoo!®. Similarly, a party directly implementing the present system can generate their own user interface for accessing the user registration server 110. This interface may offer opportunities for co-branding, strategically placed advertisements, or basic account access (e.g., a simple request for a user name and password). The user interface for the user registration server 110 is limited only in that it need be capable of accessing the user registration server 110 and directing the request, storage, or manipulation of information managed by the user registration server 110.

Figure 7:
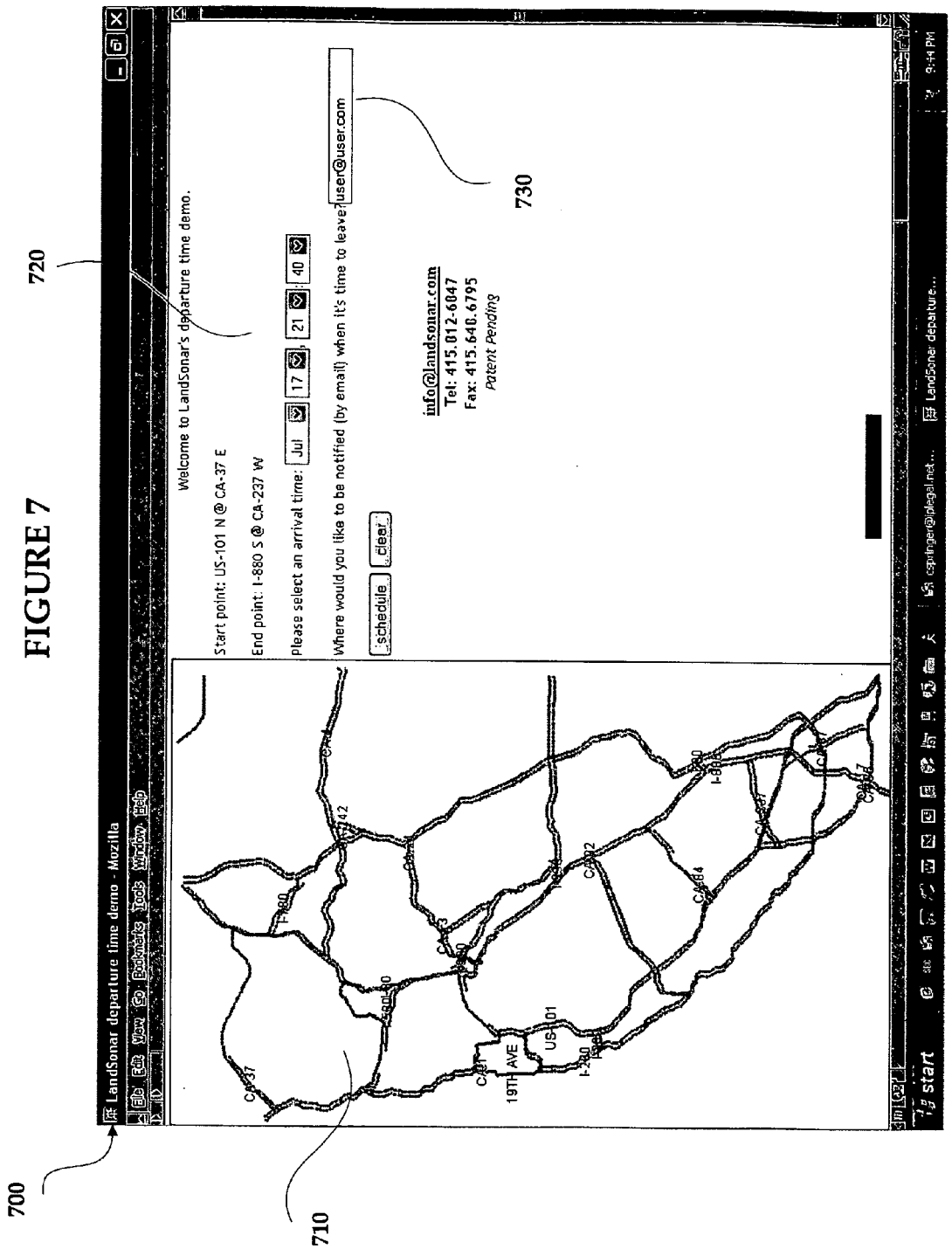
FIG. 7 shows an exemplary departure alert interface for generating a departure alert.

After authenticating the account with the user registration server 110, the user, through a departure alert interface 120, which may include a web site or other form of interface for interacting with an alert manager module 140, creates the departure alert 130. An exemplary embodiment of the departure alert interface 120 is shown in FIG. 7.

The departure alert 130 is created by providing certain attributes, such as information concerning starting point, destination, desired arrival time, routing restrictions, preferred notification method and format, and departure buffer time whereby the user may compensate for such time consuming tasks as packing a briefcase, leaving a parking garage or finding a parking spot and the user's destination. The attributes may also include any other information available to the user that might otherwise aid in calculation of a desired route, such as avoidance of construction zones or directing travel in areas offering a variety of hotels, rest stops, or restaurants. In one embodiment, the attributes and information may be entered in response to specific enumerated queries made through the departure alert interface 120 (e.g., 'What time do you wish to arrive?' or 'What is your maximum desired speed limit?'). In an alternative embodiment, attributes may be generated in response to a graphic query whereby a map is provided and the user 'clicks' on a desired starting or departure point and 'checks off' certain travel attributes (e.g., 'avoid construction zones,' '.quadrature. avoid highways with carpool lanes' or 'map route near hotels').

Some embodiments of the present invention might offer specific queries that are combined with advertising and branding opportunities. For example, instead of a query to the user that merely asks whether or not the user wishes to travel near hotels or restaurants, a query could be generated whereby the user is asked if they wish to travel near a particular brand of hotels or restaurants.

Figure 2:
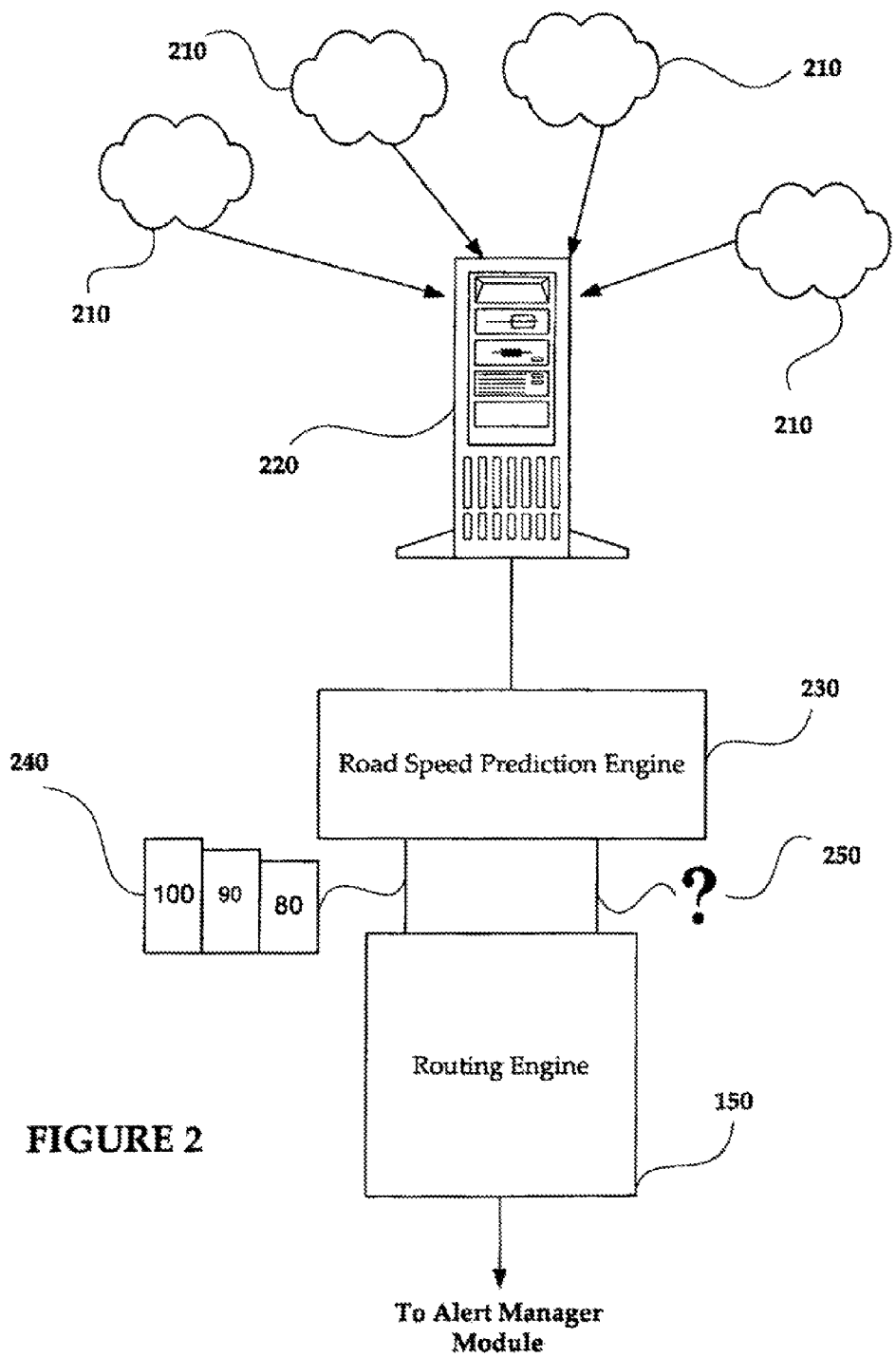
FIG. 2 shows the input and aggregation of traffic data by the system and its processing by a road speed prediction engine that interacts with the routing engine.

The attributes and information provided in the departure alert 130 are then processed by an alert manager module 140 which manages all departure alerts 130 in the system (FIG. 8) and prioritizes the departure alerts 130 for a routing engine 150 (FIG. 2). The alert manager module 140 may be embodied in software (e.g., a computer program) or hardware (e.g., an ASIC), and can be integrated into other elements of the present system. For example, the alert manager module 140 and the routing engine 150 can both be embodied in a single server. Alternatively, and again by way of example, the alert manager module 140 and the routing engine 150—and various other elements of the present system—can be embodied in independent operating structures such as a redundant array of independent disks (RAID) or on different points in a Local Area Network (LAN). So long as various elements of the present system are able to interact with one another and exchange data as is necessary, a singular housing should not be imposed as a limitation on the system.

Referring now to FIG. 2, when the departure alert 130 (FIG. 1) is generated through the departure alert interface 120 (FIG. 1), a preliminary route is created by the routing engine 150 that shows a quickest route between the departure location and destination based on current conditions as determined by a road speed prediction engine 230. A graphic representation of the preliminary route, turn-by-turn driving instructions, estimated drive time, and initial recommended departure time—that is, the date and time (e.g., hour and minute) at which a user should depart their starting destination in order to arrive 'on-time' at their final destination—are presented to the user through the departure alert interface 120 for approval.

The graphic representation, driving instructions, drive time, and departure time are generated by the routing engine 150 as derived from information provided by the road speed prediction engine 230.

From the time of approval of the preliminary route by the user through the departure alert interface 120 and until the destination is reached, the alert manager module 140 regularly queries the routing engine 150 to reassess viability of the preliminary route approved by the user to allow for an on-time arrival using updated data and information processed by the road speed prediction engine 230. For example, the road speed prediction engine 230 may process new real-time traffic data in conjunction with historically observed road speeds or the occurrence of a special event or incident to generate new short-term and long-term predictions of average road speed (collectively referred to as a prediction of average speed 240, that is, a prediction of speed for a particular segment or segments of roadway for a particular date and/or time based on available and predicted or extrapolated data).

The routing engine 150, either independently or in response to a prompt by, for example, the alert manager module 140 or the user directly, will make a similar query in a form of a request 250 for an updated prediction of average speed 240. The road speed prediction engine 230 will determine if there has been a material change—which can be a default or defined as an attribute in generating departure alert 130 (e.g., 15 minutes, 30 minutes, 1 hour)—in the estimated total travel time for the previously approved preliminary route based on the most recent prediction of average speed 240.

Figure 3:
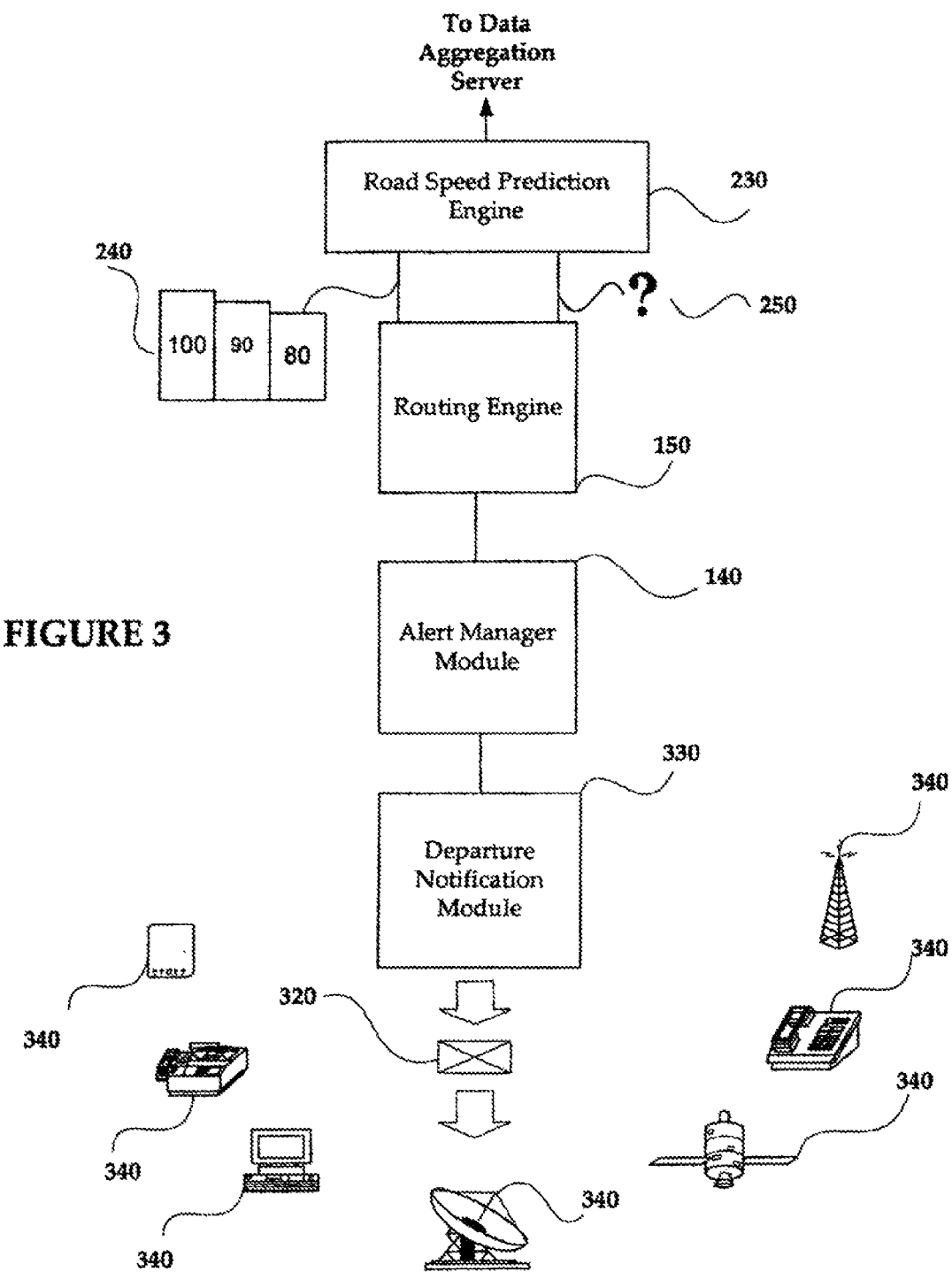
FIG. 3 shows the interaction between the data processed by the road speed prediction engine and the user information of the alert manager by the routing engine.

Referring now to FIG. 3, if there is a material change in travel time or routing as reflected by the most recent prediction of average speed 240 as generated by the road speed prediction engine 230, a departure notification 320 may be generated by the alert manager module 140, having received the updated prediction of average speed 240 via the routing engine 150, and sent to the user via a departure notification module 330.

The routing engine 150 can, through use of the most recently updated prediction of average speed 240 provided by the road speed prediction engine 230, determine a new optimal route between the departure and starting point or, if necessary, a new departure time using that same route. This new route or departure time can be included as a part of the departure notification 320 or generated in response to a subsequent query by the fouling engine 150.

For example, if a user will depart from San Jose, Calif., and wishes to travel to San Francisco, Calif., on Highway 101 North and arrive at 10.00 AM, the user accesses the system through an interface providing access to the user registration server 110 (FIG. 1) and, having been authenticated as a registered user or otherwise approved to access a particular account, through the departure alert interface 120 (FIG. 1) creates a departure alert 130 (FIG. 1).

The alert manager module 140 relays the departure alert 130, along with all other alerts in the system, via the routing engine 150. The alert manager module 130 can relay departure alerts 130 individually (i.e., on an alert-by-alert basis), by user (i.e., all alerts for a particular account), or by any other means that may provide for optimal or predetermined operation of the overall system (e.g., as created, at regularly scheduled intervals, or based on particular attributes in the departure alert 130 such as longest routes, earliest arrival times, and so forth).

The routing engine 150, based on the prediction of average speed 240 provided by the road speed prediction engine 230, determines a necessary departure time from San Jose to allow for a 10:00 AM arrival in San Francisco to be 9:11 AM. This information can be conveyed to the user via the departure alert interface 120 or, dependent upon the embodiment, through any other variety of communication mediums or protocols (e.g., instant messenger, electronic mail, SMS and so forth).

Prior to departure, the routing engine 150 will continue to query the road speed prediction engine 230 in the form of the request 250 for an updated prediction of average speed 240. For example, should a major accident occur, the routing engine 150 will, in response to the request 250, be given a new and updated prediction of average speed 240 from the road speed prediction engine 230.

The road speed prediction engine 230 will have been provided with this new data (i.e., the existence of the accident) and its effect on traffic patterns (e.g., closure of a lane of traffic). This information can be provided, for example, through direct real-time traffic data (e.g., information provided by a driver at the scene of the accident via cellular phone to a traffic hotline) or extrapolation of existing data or historically observed road speed (e.g., the closure of one lane of traffic on Highway 101 for a particular 9 mile segment of roadway at 8:00 AM is generally known to reduce traffic flow by 12 miles per hour for that particular 9 mile segment of roadway).

In response to this new data, the road speed prediction engine 230 will notify the routing engine 150 of this change whereby the routing engine 150 can calculate a new route to allow for a 10:00 AM arrival in San Francisco based on a 8:15 AM departure time from San Jose (e.g., traveling on a different highway or traversing service roads for particular parts of the journey), or generate an earlier departure time (e.g., a 10:00 AM arrival will now require departure from San Jose at 8:01 AM).

Figure 4:
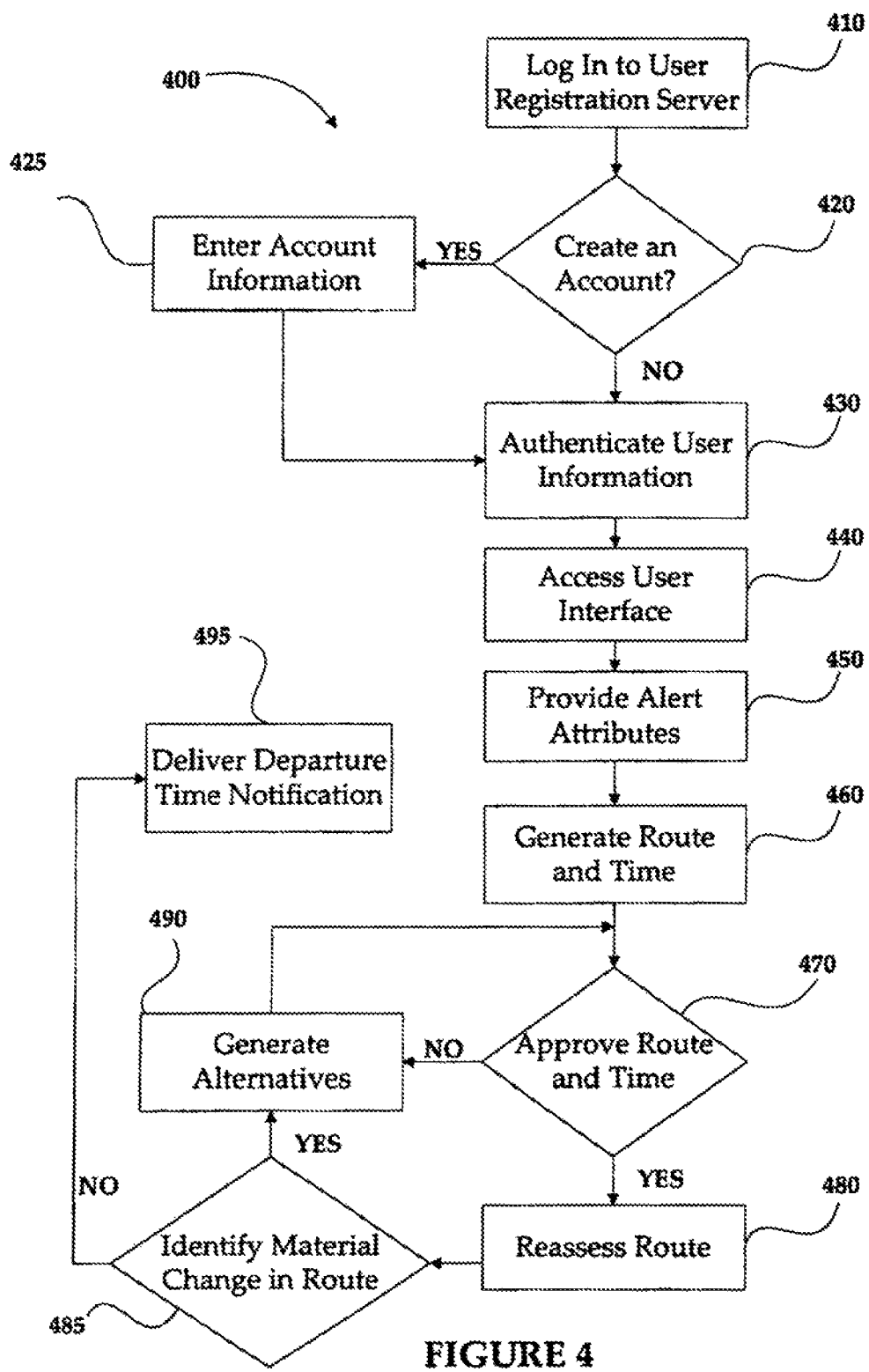
FIG. 4 shows a flowchart methodology for generating a departure alert.

FIG. 4 illustrates a flow chart 400 for generating the departure alert 130 (FIG. 1). A user will first log in 410 to the user registration server 110 (FIG. 1). If this represents a first time a user attempts to log in to the server, the user will be required to create an account 420 whereby the user registration server 110 will recognize the particular user for future interactions. If the user needs to create an account, the user will provide requisite account information 425 such as a username, a password, and contact information such as phone, email address, or SMS address. Other information may also be provided during account information entry 425 such as credit card or billing information or particular travel information such as regular departure points or destinations.

Following the generation of an account or, if an account already exists, the user will be authenticated 430 with regard to verifying if a user is who they purport to be (e.g., by cross-referencing or validating a user name with a private password), or that the user even has a right to access the system (e.g., do they currently possess an account recognized by the system).

Following authentication 430, the user will be able to generate the departure alert 130 or to otherwise interact with the system by accessing 440 the departure alert interface 120 (FIG. 1). Through the departure alert interface 120, the user can provider certain alert attributes 450 such as origination and arrival point, desired arrival time, intricacies concerning a desired route of travel, and so forth.

In response to the provided alert attributes 450, the system will generate a preliminary route 460 and recommended departure time for traversing between the origination and arrival points. The user will then have an ability to approve or reject the route 470 based on, for example, the departure time required for traversing the route and arriving 'on-time' at the user's destination.

If the route proves to be unsatisfactory, the system will generate a 'second-best' or otherwise alternative route 490 based on known travel attributes.

If the route is satisfactory, regular queries will be made of the routing engine 150 (FIG. 1) and, in turn, the road speed prediction engine 230 (FIG. 2) in order to continually reassess 480 the approved route and determine if the previously provided departure time in conjunction with the present route will still allow for an on-time arrival.

If a material change in the previously approved route is identified 485 during one of these reassessment queries 480—a traffic incident, road closure or other event otherwise causing a material change in departure time as it relates to speed and an on-time arrival—the system will notify the user of the change and generate an alternative route and/or alternative departure time 490. The user, having been informed of the change in route and/or an alternative departure time will then have an ability to approve 470 of the new travel parameters.

If the route proves to be unsatisfactory, the system will generate a 'second-best' or otherwise alternative route based on known travel attributes.

If the alternative route or departure time is satisfactory, regular queries will again be made of the routing engine 150 and, in turn, the road speed prediction engine 230 in order to reassess 480 the approved route and determine if the previously provided departure time in conjunction with the present route will still allow for an on-time arrival. Material changes in the alternative route will be identified 485 as they are with respect to the original route and addressed as set forth above.

If there is no material change—concerning either the original route or an alternative route or departure time—then the departure notification 320 (FIG. 3) will be generated and delivered 495 to the user at a time defined by the user or through a default setting of the system via the appropriate communications medium or protocol.

Reassessment of the route 480, generation of alternative routes 490, and delivery 495 of such reassessments can occur even after the initial departure time has passed. For example, if the user is traveling a particular segment of roadway as identified by the system as being the most expedient route of travel to a desired destination and an incident occurs (e.g., a major traffic accident) whereby the particular route is no longer the most efficient route of travel or arrival time will be significantly impacted, the system can reassess the route 480 and if the incident does, in fact, represent a material change, that fact will be identified 485 whereby alternative route will be generated 490. The user can then approve or disapprove 470 of these alternative routes.

Future assessments 480 can, in turn, be made of these alternative routes and any further changes in travel time can be identified 485 resulting in a similar process of alternative travel route generation) 490 and delivery 495.

Referring back to FIG. 2, FIG. 2 illustrates a portion of an exemplary system for generating departure notifications 320 (FIG. 3) whereby a data aggregation server 220 receives both real-time traffic and delayed batch traffic data sets 210 from various sources (not shown). The data aggregation server 220 manages the multiple incoming feeds of data sets 210, both real-time and delayed, and delivers these managed data sets to the road speed prediction engine 230 so that it may develop Predictions of Average Speed 240.

Data sets 210 can include what is referred to as delayed batch traffic data. This particular type of data is, generally, data that is not in real-time. While this data reflects traffic conditions on average, the data has been generated as a historical reference and may not reflect the instantaneous realities and chaos that occur in day-to-day traffic.

Data sets 210 of delayed batch traffic data can include historically observed road speeds—the average speed for a particular segment of road at a particular day and time under particular conditions—as observed by sensor loops, traffic cameras, or other means of reporting such as traffic helicopters, highway patrol reports, or drivers in traffic with cellular phones. Delayed batch traffic data sets 210 can also include weather information, incident reports (e.g., occurrence of traffic accidents and resulting road closures), information concerning traffic at particular times of year (e.g., the main access road to the beach on Labor Day), planned road construction, planned road closures, and special events such as baseball games or concerts that might otherwise affect traffic flow.

Data sets 210 can also include real-time traffic data. Real-time traffic data is data that is, generally, in real-time or generated relatively close in time after the occurrence of an incident or development of a traffic condition that the data reflects the status of traffic 'right now' or in 'real-time.' Real-time traffic data provides that information which delayed batch traffic data cannot or does not in that the data reflects the instantaneous changes that can result in a traffic commute and the chaotic intricacies that can result from, for example, 'rubber-necking' at a traffic accident or closing down three lanes on a four line highway to allow for a HAZMAT crew to arrive and clean up a chemical spill from a jackknifed tanker truck.

Real-time traffic data sets 210 can also include reports from real-time traffic sensors, helicopter traffic reports, highway patrol reports, live-news feeds, satellite data, and cellular phone calls from drivers at scene. While means for generating real-time traffic data may, in some instances, mirror those for generating delayed batch traffic data, the difference between the two types of data sets 210 lies in the historical average versus the real-time information offered by such data. Real-time traffic data sets 210 can also be generated by any number of other available manual-entry (e.g., introduction of particular traffic data into the system by a human operator at a keyboard) or automated-entry (e.g., introduction of particular traffic data into the system by another computer reviewing traffic sensors to prepare traffic reports) means.

While, in some instances, the road speed prediction engine 230 will be able to prepare a prediction of average speed 240 using only one type of data set 210—real-time traffic or delayed batch traffic data—the road speed prediction engine 230 will generally utilize both types of data sets 210 in order to generate an accurate and useful prediction of average speed 240. That is, one type of data set 210 is no more valuable, as a whole, than another and generation of the most accurate prediction of average speed 240 often requires a combination of varying data sets 210—both real-time traffic and delayed batch traffic data.

Incoming data sets 210 are collected, managed, and archived by the data aggregation server 220. The data aggregation server 220 is, largely, a database of data sets 210. Data aggregation server 220 can organize data sets 210 into various broad categories such as real-time traffic data and delayed batch traffic data. Data aggregation server 220 can also organize data sets 210 into smaller sub-categories such as sensor loop data, traffic helicopter data, or on-scene driver data. The data aggregation server 220 organizes this data in a way that allows for ease of input by the sources of various data sets 210 and ease of access by the road speed prediction engine 230. Ease of input/access can mean processing efficiency (i.e., extended searches for data need not be performed as the road speed prediction engine 230 will know exactly what part of the database to access for specific data sets 210) as well as compatibility (e.g., shared application programming interfaces (APIs) or data delivery/retrieval protocols).

The road speed prediction engine 230 will access data sets 210 managed by the data aggregation server 220 in response to a pre-programmed schedule (e.g., access the data aggregation server 220 every 5 minutes), in response to a direct request by a user or in response to a request or query by another part of the system (e.g., in response to the request 250 by routing engine 150).

The road speed prediction engine 230, through delayed batch traffic data, recognizes historical, repeating and random traffic patterns and the observable effects of those patterns as an expression of average speed for a particular segment of roadway, that is, the prediction of average speed 240.

The road speed prediction engine 230 can also take data sets 210 comprising real-time traffic data and overlay real-time traffic information with historical, repeating, and random traffic patterns and extrapolate real-time, present effects on traffic patterns, and further express average speeds for a particular segment of roadway—the prediction of average speed 240—thereby further increasing the accuracy and value of such a prediction.

For example, the road speed prediction engine 230 requests data sets 210 comprising historically observed road speed data (delayed batch traffic data) for Highway 101 North between San Jose and Palo Alto, Calif. on Monday mornings between 5:30 AM and 9:00 AM (generally peak commute and traffic time). The road speed prediction engine 230 then analyzes this data over a period of, for example, three weeks and interprets that data as an expression of average speed for that segment of roadway—the prediction of average speed 240—for future Mondays between 5:30 AM and 9:00 AM.

Thus, the data aggregation server 220 collects data sets 210 concerning road speed for the segment of roadway—Highway 101 North between San Jose and Palo Alto, Calif.—over a three-week period. The road speed prediction engine 230 accesses that data, which may be 56 mph in week one, 54 mph in week two, and 62 mph in week three. The road speed prediction engine 230, through the execution of any number of mathematical algorithms formulated to predict short-term or long-term average speeds, will recognize the average speed for that segment of roadway—the prediction of average speed 240—to be 57.3 mph on Mondays between 5:30 AM and 9:00 AM.

The road speed prediction engine 230 modifies long-term (e.g., likely average speed over the next three months) and short-term predictions (e.g., likely average speed for the next hour) of average speed for particular segments of roadways. These long- and short-term predictions are based on the aggregated data sets 210 managed by the data aggregation server 220. These predictions may change in the long-term because of, for example, road construction and known road closures. These predictions may change in the short-term because of, for example, random events such as accidents.

These modifications, too, are expressed as a part of the prediction of average speed 240. By taking into account short-term and long-term predictions, the prediction of average speed 240 for a journey in three weeks (an example of a long-term prediction) will not be skewed by the fact that a major car accident with multiple fatalities has occurred on that same segment of roadway, today, thereby resulting in multiple lane closures and an increase in travel time for the next several hours (a short-term prediction).

For example, taking the segment of roadway—Highway 101 North between San Jose and Palo Alto, Calif.—we know, from delayed batch traffic data, the average speed for that segment of roadway is 57.3 mph on Mondays between 5:30 AM and 9:00 AM. Should, for example, a traffic accident resulting in one lane closure for a distance of two miles occur at 6:00 AM, this occurrence (a part of the data set 210) will be collected by the data aggregation server 220 and eventually shared with the road speed prediction engine 230. The road speed prediction engine 230 can overlay this real-time accident and lane-closure data with the historical road speed and extrapolate the effect of the lane-closure and a new prediction of average speed 240—an average increase of 7 minutes based on the time, distance, and location of the lane-closure.

This incident, however, will not affect the prediction of average speed 240 for a trip scheduled three-weeks from now in that the road speed prediction engine 230 recognizes that the change in average speed for the next several hours is a short-term prediction. In contrast, the trip scheduled for several weeks from now is a long-term prediction wherein the traffic accident will have since been resolved and traffic patterns will return to normal.

The road speed prediction engine 230 delivers these predictions of average speed 240 to the routing engine 150. The routing engine 150 that then determines the optimal departure time and/or departure route based on information provided by the user in creating the departure alert 130 (FIG. 1).

The routing engine 150 makes a determination of departure time by evaluating the long-term and/short-term Predictions of Average Speed 240 for a particular segment or segments of roadway that comprise the route of travel between a user's point of origin and ultimate destination. After identifying the prediction of average speed 240 for a particular segment or segments of roadway, the routing engine 150, through mathematical calculation, determines the time necessary to traverse the particular road segments at that average speed. The routing engine 150, in light of the desired arrival time, then determines what time it will be necessary to depart the user's point of origin in order to arrive at the destination at the given time while traveling the known number of miles at the average prediction of speed.

For example, if the prediction of average speed 240 for a segment of roadway between the point of origin and the user's destination is 60 miles per hour and that road segment if 120 miles in length, it will take two hours traveling at the average speed to arrive at the destination from the point of origin. If the user desires to arrive at 3:00 PM, it will be necessary to depart at 1:00 PM (in order to travel the 120 mile distance at 60 miles per hour in 2 hours).

Additionally, the routing engine 150 can take into account certain attributes provided by the user during the generation of their departure alert 130 as these attributes pertain to the user's particular driving style, tendencies, or other desires and requirements.

For example, if the user still wishes to traverse the aforementioned 120 mile segment of roadway but refuses to drive at a speed above 30 miles per hour, this will obviously impact travel and arrival time despite the prediction of average speed 240. Taking into account the aforementioned prediction of average speed 240 and the user attribute limitation (i.e., a refusal to drive at more than 30 miles per hour), the routing engine 150 will now determine the travel time for that same segment of roadway to be 4 hours. If the user still wishes to arrive at 3:00 PM, it will now be necessary to departure at 11:00 AM resulting in a changed departure time to be delivered to the user.

The routing engine 150 may use a similar process to generate and, if necessary, elect an alternative route of travel to achieve an on-time arrival at the desired destination. If it becomes evident that the initial route chosen by the user will take longer to travel because of incidents or user imposed limitations (e.g., user attributes), then the routing engine 150 will recognize the imposition of an increasingly earlier departure time and seek out an alternative route of travel that, for example, is better suited to the user's driving attributes or provides a similar route of travel but with less traffic delays.

Figure 5:
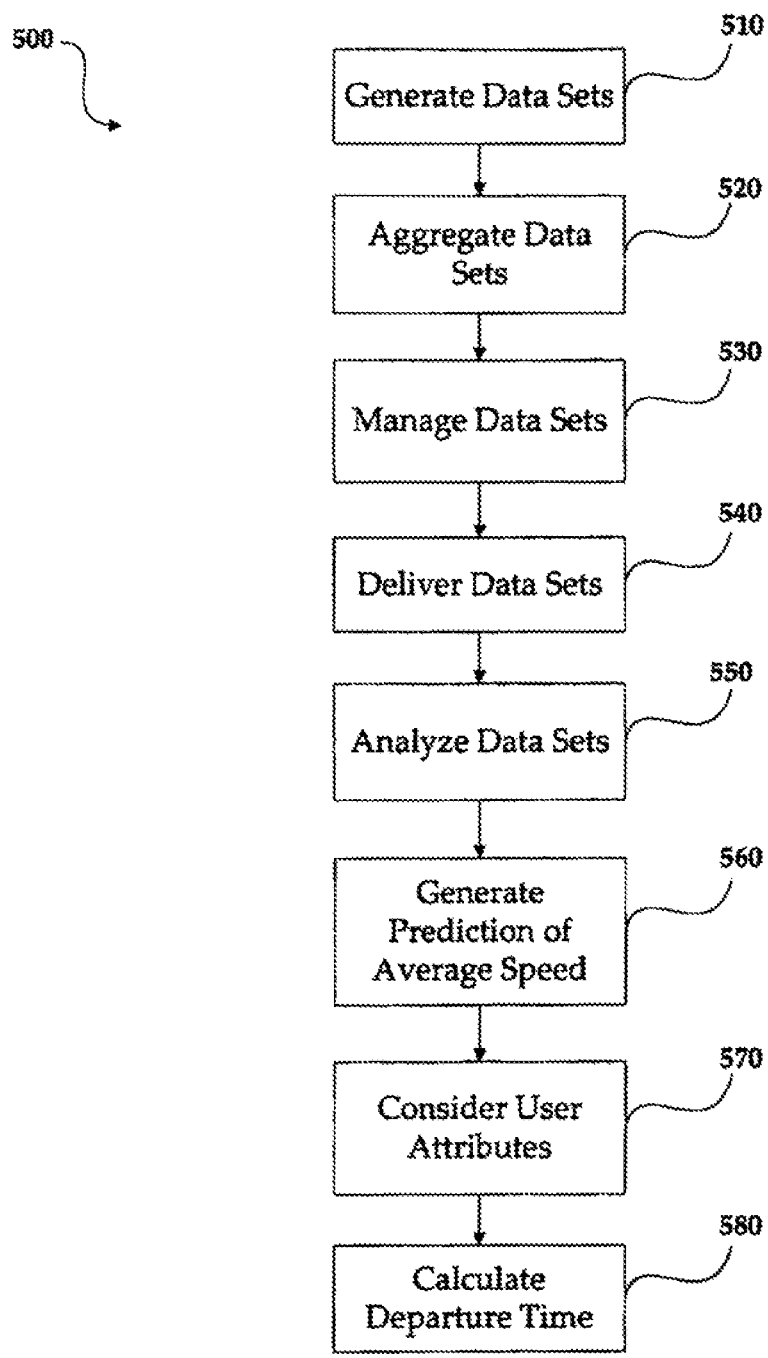
FIG. 5 shows a flowchart methodology for calculating a departure time

FIG. 5 illustrates a flow chart 500 for generating the prediction of average speed 240 (FIG. 2) wherein data sets 210 (FIG. 2) are initially generated 510 from a variety of sources such as traffic sensor loops, highway patrol traffic reports, or preexisting traffic information databases. Information can be generated automatically (e.g., by a computer) or entered manually (e.g., by a person).

Data sets 210 are then aggregated 520 by the data aggregation server 220 (FIG. 2). Aggregation of data sets 210 can occur on a regularly scheduled basis or in response to certain stimuli such as queries from other elements of the system. Aggregation 520 can also include collection of data from a database of information that is integrated into the system (e.g., memory containing traffic records and other information for particular segments of roadway for the past year). Aggregation 520 can be a result of data being 'pushed' to the data aggregation server 220 from outside sources, that is, the outside sources deliver data sets 210 to the data aggregation server 220. Aggregation 520 can also be a result of data being 'pulled' from outside sources, that is, the data aggregation server 220 specifically requests or accesses the data from the outside source.

Once data has been aggregated 520, the data aggregation server 220 will manage 530 the aggregated data sets 210. Management 530 may include categorizing certain data sets 210 as being real-time traffic data or delayed batch traffic data, or into even more specific categories such as data as it pertains to particular segments of roadway. Management 530 of traffic data can also comprise storage of specific datum to particular areas of memory to allow for quicker access and faster processing times.

Once data has been managed 530 by the data aggregation server 220, the data is then delivered 540 to the road speed prediction engine 230 (FIG. 2). Data can be delivered 540 as part of a specific request by the road speed prediction engine 230 or as a result of a routinely scheduled transfer of data. Once data has been delivered 540 to the road speed prediction engine 230, various algorithms, prediction models, or other means to generate 560 a prediction of average speed 240 (FIG. 2) are executed as a part of the analysis 550 of the received data sets 210. Data is analyzed 550 in order to calculate and generate predictions of average speed 240 for particular segments of roadway. Analysis 550 of data sets can occur through the use of publicly known algorithms and models or through proprietary formulas and models. Any means that helps generate 560 a prediction of average speed 240 may also be used.

Once the prediction of average speed 240 has been generated 560, that prediction 240 is further considered 570 in light of certain attributes provided by the user. That is, if the user has imposed certain attributes concerning desired conditions of, or limitations to, travel over a particular route, the prediction of average speed 240 may not accurately allow for calculation 580 of a departure time.

For example, if the prediction of average speed 240 for a particular sixty-mile segment of roadway is sixty miles per hour, the travel time for the segment would be one hour causing an initial calculation 580 of departure time to be one hour prior to the desired arrival time. If, for example, the user has indicated the necessity to travel no faster than thirty miles per hour due to a vehicle towing a heavy load, then travel time—regardless of the prediction of average speed 240—would increase to two hours. This increase in actual travel time would affect the calculation 580 of departure time wherein departure must now occur two hours prior to the desired arrival time due to the additional user attribute limitation.

Once all known (e.g., user attribute limitations) or expected factors (e.g., predicted road speed) have been considered, however, a departure time as it relates to desired arrival time can be calculated 580 and ultimately delivered to the user.

Referring back to FIG. 3, FIG. 3 illustrates a portion of the exemplary system for generating and delivering departure notifications 320 wherein the routing engine 150 uses the latest available prediction of average speed 240 from the road speed prediction engine 230 to determine the optimal departure time and/or route between a point of origin and a point of destination according to information and attributes received from the alert manager module 140. Delivery of departure notifications 320 can comprise the initial reporting of optimal departure time or subsequent changes in departure time due to incidents (e.g., accidents) occurring on a particular segment of roadway or, if conditions warrant, the need for a change in travel route are relayed by the routing engine 150 to the alert manager module 140.

Upon receiving information from the routing engine 150 as it pertains to route or departure time, the alert manager module 140, dependent on delivery settings and various limitations (e.g., attributes) provided by the user, will relay the departure and travel information to the departure notification module 330. The departure notification module 330 generates, manages, and provides for the delivery of departure notifications 320 to a user via a desired notification delivery protocol 340.

For example, a user can, through the departure alert interface 120 (FIG. 1), generate settings to provide for the delivery of the departure notification 320 through the desired notification delivery protocol 340. Examples of various protocols include SMS to a cellular phone, electronic mail to an electronic mail address, or via a proprietary data network to a Personal Digital Assistant (PDA) such as a Blackberry™.

In addition to delivering the departure notification 320 to a user as to the initial departure time, the departure notification module 330 can be instructed to deliver a subsequent departure notification 320 if a pre-scheduled departure time changes in excess of, for example, 10 minutes as determined by the routing engine 150 in response to predictions of average speed 240 generated by the road speed prediction engine 230.

By means of another example, the user can also create a setting whereby the user is provided with the most up-to-date departure time regardless of change, if any, 24-hours before an initially scheduled departure time. This information is delivered to the user via the departure notification 320 through the desired notification delivery protocol 340 as generated, managed, and sent by the departure notification module 330. These examples are simply illustrative and by no means limiting as to the scope of setting possibilities by the user.

For example, a user originates in San Jose, Calif. and wishes to travel to San Francisco, Calif., on Highway 101 North and arrive at 10:00 AM. The system, utilizing the various elements and processes set forth above, determines the optimal departure time to be 8:15 AM to allow for a 10:00 AM arrival. The alert manager module 140 will relay this information to the departure notification module 330. Using the desired notification time (e.g., 24 hours prior to departure) and protocol (e.g., electronic mail), the departure notification module 330 will create and deliver the departure notification 320 to the user at a pre-specified electronic mail address twenty-four hours prior to the optimal departure time.

Continuing the example, prior to departure, a major accident occurs on Highway 101 at 4:00 AM on the day of departure requiring the highway to be closed for six hours for hazardous material cleanup. Subject to data sets 210 reflecting the occurrence of this incident and as collected by the data aggregation server 220, the road speed prediction engine 230 generates a new prediction of average speed 240 reflecting slower speed and, therefore, longer travel time along this particular segment of roadway.

The routing engine 150, following the request 250, recognizes the new prediction of average speed 240 to reflect a substantial change in average speed and travel time. The routing engine 150 then determines 8:15 AM to no longer be the optimal departure time for the 10:00 AM arrival in San Francisco. The routing engine 150 recognizes that travel on Highway 101 is, in fact, impossible for the next several hours and that travel on Highway 880 North is now the optimal route with a 7:45 AM departure time due to increased traffic diverted from Highway 101 North.

The routing engine 150 relays this information to the alert manager module 140 and, the alert manager module 140, recognizing the user must arrive in San Francisco by 10:00 AM, instructs the departure notification module 330 to create and deliver the departure notification 320 to the user via the predetermined notification delivery protocol 340.

Figure 6:
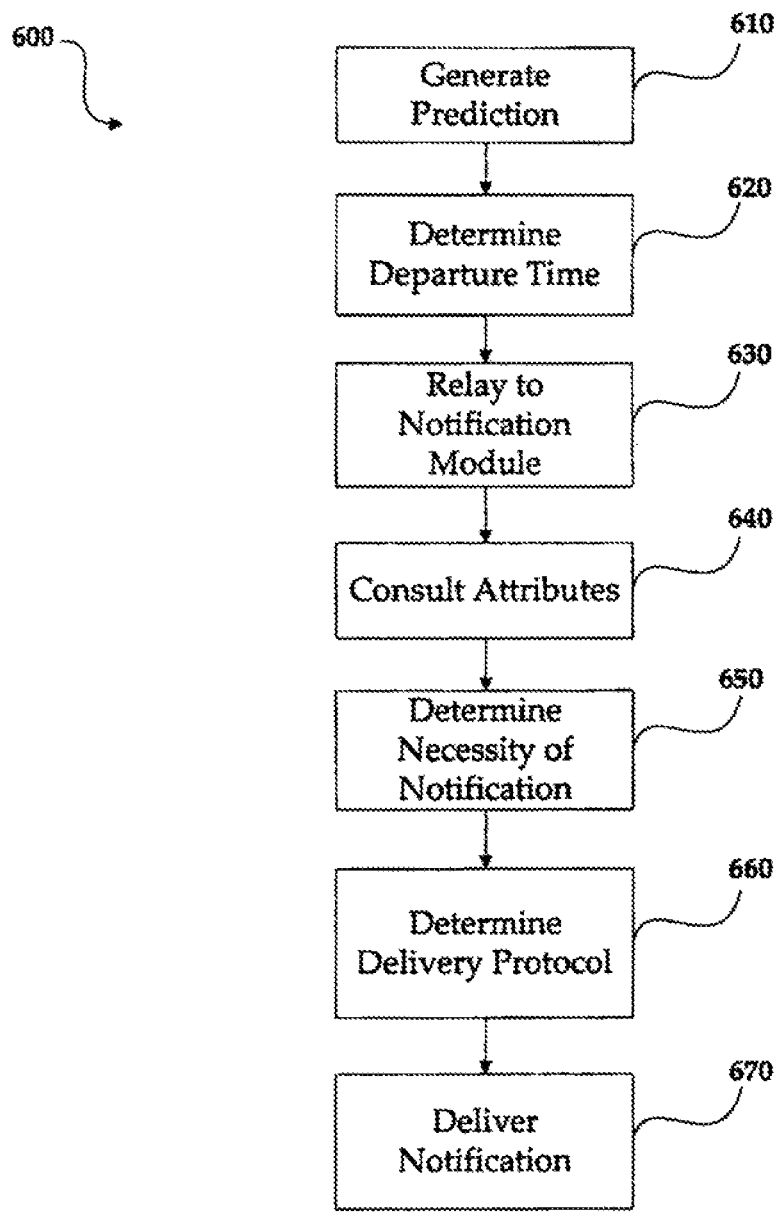
FIG. 6 shows a flowchart methodology for delivering an alert notification.

FIG. 6 illustrates a flow chart 600 for generating and delivering the departure notification 320 (FIG. 3) whereby, in accordance with user defined attributes managed by the alert manager module 140 (FIG. 1), a departure notification module 330 (FIG. 3) will generate and deliver, over a desired notification delivery protocol 340 (FIG. 3), departure notifications 320 that reflect initial or changed optimal departure times in addition to reminders of departure time and new routes of travel as current travel conditions may warrant or require.

The prediction of average speed 240 (FIG. 2) is generated 610 by the system and the routing engine 150 (FIG. 1) then makes a determination 620 of the necessary departure time in order to achieve an on-time arrival at the user's destination as identified by the user. This initial departure time and other travel information and data is then relayed 630 to the departure notification module 330.

The departure notification module 330 will also take into account 640 attributes as provided by the user such as limitations on speed or types of roads to be travel (e.g., highway v. city streets). The departure notification module 330 will then determine 650 the necessity of generating and delivering the departure notification 320. If the departure notification 320 is the initial departure notification 320 to be delivered to the user indicating the necessary departure time, this determination 650 will be in the affirmative. If the departure notification 320 is not the initial notification, determination 650 will be based on whether or not a change in travel route or travel time requires delivery of a subsequent departure notification 320. This determination 650 will, in part, be based on other attributes provided by the user such as how much of a change in travel time will warrant the delivery of the subsequent departure notification 320.

If an initial or subsequent departure notification 320 is required, the protocol to be utilized in delivering the departure notification 320 will be identified 660 (also from user identified attributes). After having determined the necessity of departure notification 320 and identification 660 of the requisite delivery protocol, the departure notification 320 will be delivered 670 to the user.

In an alternative embodiment of the present invention, the actual route embarked upon by the user can be delivered to the user in real-time whereby driving directions and/or instructions are sent to the user in a modified departure notification 320. The user receives these driving directions and/or instructions a few minutes ahead of time as to when and where the directions and/or instructions are actually needed (e.g., turn right at Fourth and Main). The modified departure notification 320 would be generated by the departure notification module 330 and based, in part, upon the prediction of average speed 240 whereby the system predicts where a user should be on the actual route based on known departure time and other known conditions affecting the prediction of average speed 240 as reflected in data sets 210.

FIG. 7 is an example of an interface 700 for generating a departure alert 130 (FIG. 1). A user may select a point of origin and destination on map 710 by positioning a cursor over the point of origin and point of destination and 'clicking' a mouse. In alternative embodiments, the point of origin and point of destination may be typed in using, for example, a keyboard. The desired arrival time may be entered through a scroll-down entry 720. In alternative embodiments, this information may also be typed in using a keyboard. Finally, a method of delivering the departure notification 320 may be indicated at e-mail entry 730. In alternative embodiments, the method of delivering the departure notification 320 could also include SMS, instant message, facsimile, telephone, and so forth.

Figure 8:
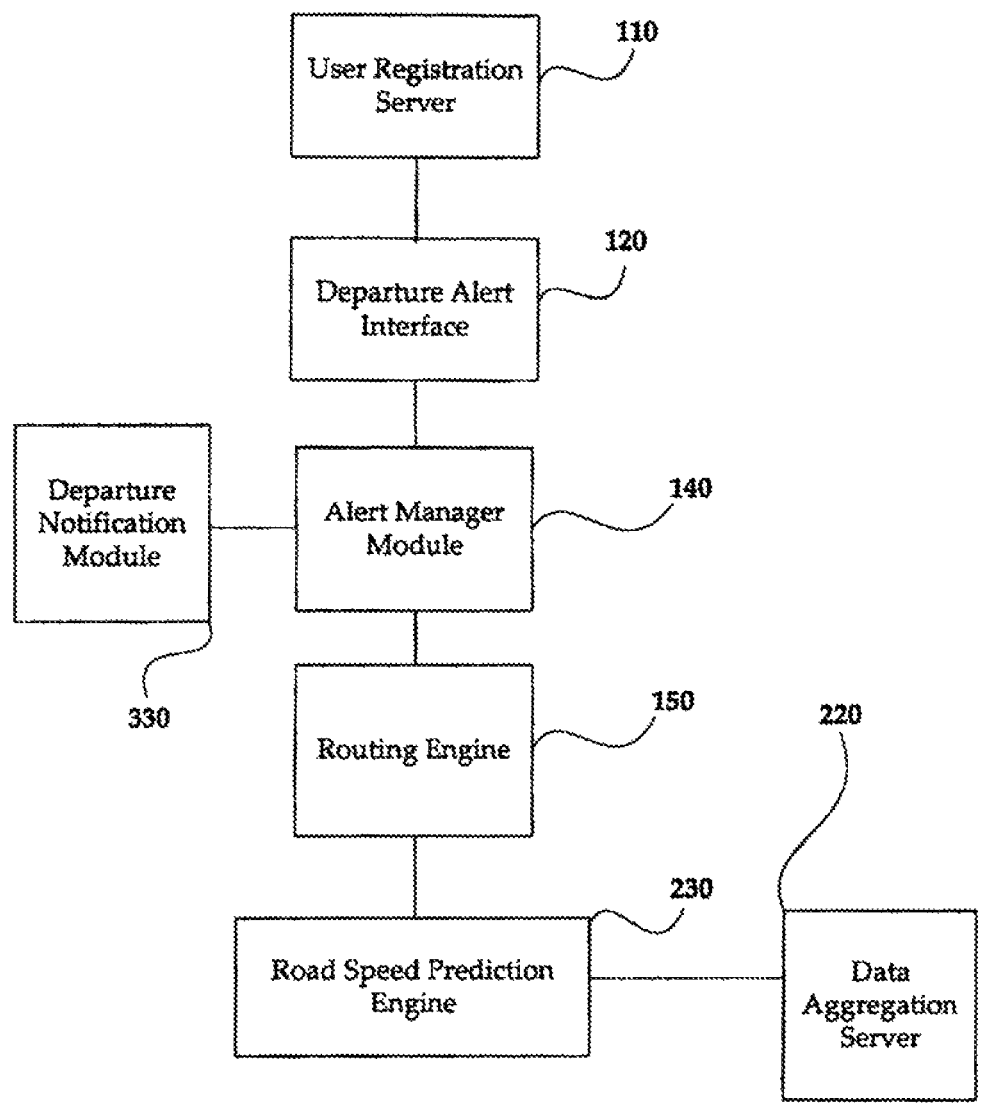
FIG. 8 shows an exemplary representation of the entire system, according to one embodiment of the present invention.

FIG. 8 shows an exemplary integration of the various elements of the system (FIGS. 1-3).

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

Notwithstanding the providing of detailed descriptions of exemplary embodiments, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process, or manner.

What is claimed is:

1. A system for delivering departure alerts to the user, the system comprising:
   a data aggregation server containing data pertaining to traffic conditions for a plurality of road segments; and
   a departure alert interface device, the departure alert interface device including a processor that executes instructions stored in memory, wherein execution of the instructions by the processor:
      receives user input associated with a scheduled trip, the user input including an origination point, desired arrival point, desired arrival date, and desired arrival time,
      generates a preliminary route of travel based on the user input;
      receives data pertaining to traffic conditions stored in the data aggregation server, wherein the received data pertains to a plurality of road segments associated with the generated preliminary route of travel,
      evaluates estimated travel time for the generated preliminary route of travel, the evaluated travel time based on the accessed data from the data aggregation server and the user input, and
      provides one or more departure notices that includes a departure time and the generated preliminary route of travel that satisfies the user input associated with the scheduled trip.

2. The system of claim 1, wherein the processor further generates instructions for a display to display the one or more departure notices and associated generated preliminary route of travel for a user to view.

3. The system of claim 2, wherein the processor further receives user selection of one or more of the displayed departure notices.

4. The system of claim 3, wherein the processor further delivers the one or more selected departure notices at corresponding notification times, the notification times indicating a departure time that satisfies the user arriving at the desired arrival point at the desired arrival date and time using the generated preliminary route of travel.

5. The system of claim 1, wherein the data pertaining to traffic conditions for the plurality of road segments stored in the data aggregation server is updated at regular intervals of time.

6. The system of claim 1, wherein the data pertaining to traffic conditions for the plurality of road segments stored in the data aggregation server is organized into a plurality of categories.

7. The system of claim 1, wherein the user input further includes a user desired maximum speed limit and desired travel areas along a route of travel.

8. The system of claim 1, wherein the desired traveled areas along a route of travel includes hotels, rest stops and restaurants.

9. The system of claim 6, wherein the categories are broad categories including real-time traffic data and delayed batch traffic data.

10. The system of claim 9, wherein delayed batch traffic data includes weather information, incident reports, information concerning traffic at particular times of the year, planned road construction, planned road closures and special events.

11. The system of claim 6, wherein the categories are sub-categories identifying a source of the data acquired by the data aggregation server.

12. The system of claim 1, wherein further execution of the instructions by the processor:

receives user input on the generated preliminary route of travel, wherein the user input includes user disapproval of the generated preliminary route of travel, generates a second route of travel based on the user input upon receiving user disapproval of the generated preliminary route of travel, evaluates a second estimated travel time for the generated second route of travel, the second evaluated travel time based on the accessed data from the data aggregation server and the user input, and provides one or more updated departure notices that includes updated departure times that satisfies the user input associated with the scheduled trip.

13. The system of claim 1, wherein further execution of the instructions by the processor:

accesses data stored in the data aggregation server, wherein the access obtains updated data pertaining to recent traffic conditions for the plurality of road segments;

evaluates an updated estimated travel time for the generated preliminary route of travel, the updated travel time based on the updated data accessed from the data aggregation server and the user input;

determines that the updated estimated travel time for the generated preliminary route of travel does not satisfy the user input associated with the scheduled trip;

generates an alternate route of travel based on the user input and the updated data from the data aggregation server;

evaluates an estimated travel time for the generated alternate route of travel, the updated travel time based on the updated data accessed from the data aggregation server and the user input; and provides one or more updated departure notices that includes updated departure times and the generated alternate route of travel that satisfies the user input associated with the scheduled trip.

* * * * *